United States Patent
Lee et al.

(10) Patent No.: US 9,591,702 B2
(45) Date of Patent: Mar. 7, 2017

(54) DYNAMICALLY RECONFIGURABLE LED DRIVERS AND LIGHTING SYSTEMS

(71) Applicant: American Bright Lighting, Inc., Chino, CA (US)

(72) Inventors: George Lee, Rowland Heights, CA (US); Arthur Young, Walnut, CA (US); Stanley Chen, San Gabriel, CA (US)

(73) Assignee: AMERICAN BRIGHT LIGHTING, INC., Chino, CA (US)

( * ) Notice: Subject to any disclaimer, the term of this patent is extended or adjusted under 35 U.S.C. 154(b) by 38 days.

(21) Appl. No.: 14/303,942

(22) Filed: Jun. 13, 2014

(65) Prior Publication Data

US 2015/0042234 A1 Feb. 12, 2015

Related U.S. Application Data

(60) Provisional application No. 61/863,327, filed on Aug. 7, 2013.

(51) Int. Cl.
*H05B 33/08* (2006.01)

(52) U.S. Cl.
CPC ........... *H05B 33/08* (2013.01); *H05B 33/083* (2013.01); *H05B 33/0806* (2013.01); *H05B 33/0812* (2013.01); *H05B 33/0824* (2013.01)

(58) Field of Classification Search
CPC ............ H05B 33/0806; H05B 33/0812; H05B 33/0824; H05B 33/083
See application file for complete search history.

(56) References Cited

U.S. PATENT DOCUMENTS

| | | | |
|---|---|---|---|
| 8,410,717 B2 | 4/2013 | Shteynberg et al. |
| 8,410,720 B2 | 4/2013 | Holec et al. |
| 8,456,095 B2 | 6/2013 | Huynh |
| 8,476,836 B2 | 7/2013 | van de Ven et al. |
| 2009/0160358 A1 | 6/2009 | Leiderman |

(Continued)

OTHER PUBLICATIONS

Supertex CL8800, Sequential Linear LED Driver, Product Summary Sheet, Apr. 24, 2014; Printed Jul. 15, 2014, http://www.supertex.com/pdf/misc/CL8800_PSS.pdf.

(Continued)

*Primary Examiner* — Douglas W Owens
*Assistant Examiner* — Pedro C Fernandez
(74) *Attorney, Agent, or Firm* — Innovation Capital Law Group, LLP; Vic Lin

(57) ABSTRACT

LED drivers and lighting systems having a dynamically reconfigurable switching network is disclosed. The lighting system comprises a switching network which provides interconnections between LEDs or LED lamps that can dynamically reconfigure between largely parallel circuits and largely serial circuits as the instantaneous voltage of a power supply varies. When the instantaneous voltage of the power source is low, the switching network interconnects the LED lamps in a largely parallel configuration. As the instantaneous voltage increases, the switching network reconfigures and interconnects the LED lamps with increasing serial configurations. As the instantaneous voltage begins to decrease, the switching network reconfigures and interconnects the LED lamps back to a largely parallel configuration.

22 Claims, 17 Drawing Sheets

(56) References Cited

U.S. PATENT DOCUMENTS

| | | | | |
|---|---|---|---|---|
| 2010/0133289 | A1* | 6/2010 | Michels | B65H 29/006 221/71 |
| 2010/0231135 | A1* | 9/2010 | Hum | H05B 33/083 315/250 |
| 2010/0308738 | A1* | 12/2010 | Shteynberg | H05B 33/0812 315/185 R |
| 2012/0081009 | A1 | 4/2012 | Shteynberg et al. | |
| 2012/0091920 | A1* | 4/2012 | Yang | H05B 33/0824 315/320 |
| 2013/0002141 | A1 | 1/2013 | Lee | |
| 2013/0181621 | A1 | 7/2013 | Frias | |

OTHER PUBLICATIONS

Login Digital LID-PC-F103A, 2009; Printed Jul. 15, 2014, http://www.cnledw.com/inter/upload/2012030822481427192.pdf.

Innovision AC Power Direct LED Driver IC for LED Lighting; DCL1118, Version 1.2, Oct. 2011; Printed Jul. 15, 2014, http://www.cnledw.com/UploadFileNew/blogLog/2011/12/2011123111073425.pdf.

Exclara EXC100, HVX improves power factor; LED Dricver IC, Mkt. Analysis and Forecast 2011; Srategies unlimited Jul. 2011; http://www.exclara.com/index.php/en/products-en/exclara-hvx-family.

Exclara EXC100, High-Voltage LED Driver IC; Product Brief; Aug. 3, 2011; http://www.exclara.com/templates/theme700/document/EXC100%20ProductBrief.US.pdf.

Exclara EXC100, Exclara Launches Lowest Cost, Highest Quality and Smallest High-Voltage LED Driver Solution, Jun. 9, 2011; http://www.marketwired.com/press-release/exclara-launches-lowest-cost-highest-quality-smallest-high-voltage-led-driver-solution-1525229.htm.

Notification of Transmittal of the International Search Report and the Written Opinion of the International Searching Authority (mailing date Nov. 4, 2014) for PCT/US2014/045540, filed on Jul. 7, 2014.

* cited by examiner

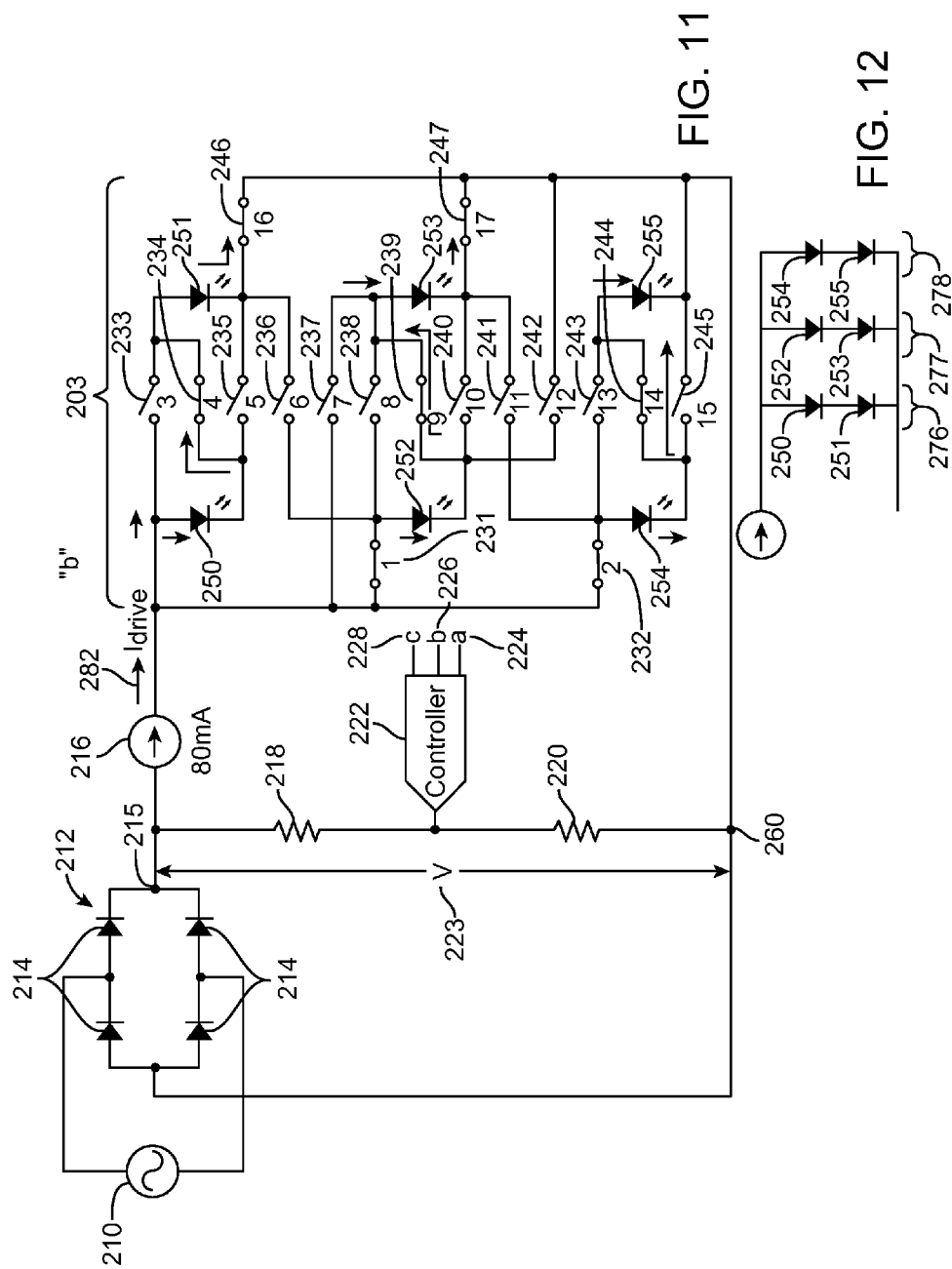

DYNAMICALLY RECONFIGURABLE LED DRIVERS AND LIGHTING SYSTEMS

RELATED APPLICATION INFORMATION

The present application claims priority under 35 U.S.C. Section 119(e) to U.S. Provisional Patent Application Ser. No. 61/863,327 filed Aug. 7, 2013 entitled "Interconnection Switching LED Driver," the disclosure of which is incorporated herein by reference in its entirety.

BACKGROUND OF THE INVENTION

1. Field of the Invention

The present invention relates in general to light emitting diode ("LED") drivers and lighting systems. More particularly, the invention is directed to LED lighting systems having reconfigurable interconnections.

2. Description of the Related Art

Lighting apparatuses having LEDs are becoming increasingly common as they offer higher efficiencies and longer lifetimes as compared to conventional light sources such as incandescent lamps. Some recent lighting apparatuses drive LED arrays from AC power sources. However, these lighting apparatuses may not exhibit optimal performance.

Accordingly, a need exists to improve the LED drivers and lighting systems.

SUMMARY OF THE INVENTION

In the first aspect, an LED driving circuit for driving light emitting diodes is disclosed. The circuit comprises a bridge rectifier coupled to an alternating current (AC) power source providing a pulsed DC live feed current and receiving a neutral return current. The circuit further comprises a controller coupled to the AC power source, the controller monitoring the power cycle and providing control signals during time periods based on the power cycle. The circuit further comprises a constant current source coupled to the bridge rectifier receiving the feed current and providing an LED drive current, the constant current source limiting the LED drive current to a maximum drive current. The circuit further comprises a dynamically reconfigurable switching network receiving the LED drive current and the control signals, the switching network configured for electrically coupling the LEDs forming at least one parallel branch, wherein each branch is configured to receive at least a portion of the LED drive current, energize the LEDs within the branch, and return at least a portion of the return current to the bridge rectifier, the switching network having a first mode of operation in which the LEDs are interconnected having a first number of branches, and a second mode in which the LEDs are interconnected having a second number of branches not equal to the first number of branches, wherein each branch comprises the same number of LEDs.

In a first preferred embodiment, the controller provides the control signals based on the voltage of the pulsed DC live feed current, and the switching network changes modes of operation in response to the control signals from the controller. The switching network preferably further comprises additional modes of operation in which the LEDs are interconnected having another number of branches not equal to the number of branches in the other modes. The LEDs preferably comprise high voltage LEDs each having a string of individual LEDs connected in series. The switching network preferably comprises a plurality of single-pole, single-throw switches and a plurality of pathways coupling the LEDs and the switches in the switching network, and each switch comprises a Metal Oxide Semiconductor Field Effect Transistor (MOSFET). The constant current source preferably limits the LED drive current based on control signals from the controller. The constant current source preferably varies the limits the LED drive current based on the value of voltage of the AC power source. The AC power source preferably comprises a 120 Volt source. The AC power source preferably comprises a 240 Volt source. The AC power source preferably comprises an 85-277 Volt source.

In a second aspect, an LED lighting system is disclosed. The LED lighting system comprises a bridge rectifier coupled to an alternating current (AC) power source providing a pulsed DC live feed current and receiving a neutral return current, and a controller coupled to the AC power source, the controller monitoring the power cycle and providing control signals during time periods based on the power cycle. The LED lighting system further comprises a constant current source coupled to the bridge rectifier receiving the feed current and providing an LED drive current, the constant current source limiting the LED drive current to a maximum drive current, and a plurality of LEDs. The LED lighting system further comprises a dynamically reconfigurable switching network receiving the LED drive current and the control signals, the switching network electrically coupled to the LEDs forming at least one parallel branch, wherein each branch receives at least a portion of the LED drive current, energizes the LEDs within the branch, and return at least a portion of the return current to the bridge rectifier, the switching network having a first mode of operation in which the LEDs are interconnected having a first number of branches, and a second mode of operation in which the LEDs are interconnected having a second number of branches not equal to the first number of branches, wherein each branch comprises the same number of LEDs.

In a second preferred embodiment, the controller provides control signals based on the voltage of the pulsed DC live feed current, and the switching network changes modes of operation in response to the control signals from the controller. The switching network preferably further comprises additional modes of operation in which the LEDs are interconnected having another number of branches not equal to the number of branches in the other modes. The LEDs preferably comprise high voltage LEDs each having a string of individual LEDs connected in series. The switching network preferably comprises a plurality of single-pole, single-throw switches and a plurality of pathways coupling the LEDs and the switches in the switching network, and each switch preferably comprises a Metal Oxide Semiconductor Field Effect Transistor (MOSFET). The constant current source preferably limits the LED drive current based on control signals from the controller. The constant current source preferably varies the limits the LED drive current based on the value of voltage of the AC power source. The AC power source preferably comprises a 120 Volt source. The AC power source preferably comprises a 240 Volt source. The AC power source preferably comprises an 85-277 Volt source.

In a third aspect, a method for generating light comprises providing alternate current (AC) having power cycles, rectifying the alternate current to form a full-wave rectification signal, generating a LED drive current based on the full-wave rectification signal, electrically interconnecting LEDs into at least one parallel branch to form a first circuit in a first mode of operation, receiving by each branch at least a portion of the LED drive current, energizing the LEDs within each branch, and reconfiguring the electrical interconnections of the LEDs to form a second circuit having a second number of branches, where the second circuit differs from the first circuit.

In a third preferred embodiment, the method further comprises providing control signals based on the instantaneous voltage of the full-wave rectification signal, wherein reconfiguring the electrical coupling of the LEDs comprises changing the modes of operation based on the control signals.

These and other features and advantages of the invention will become more apparent with a description of preferred embodiments in reference to the associated drawings.

DESCRIPTION OF THE DRAWINGS

FIG. 11 is circuit diagram of a CC lighting system showing the current paths when the voltage meets or exceeds $V_b$.

FIG. 12 depicts the equivalent diagram of the circuit depicted in FIG. 11.

DETAILED DESCRIPTION OF THE PREFERRED EMBODIMENTS

Figure 1:
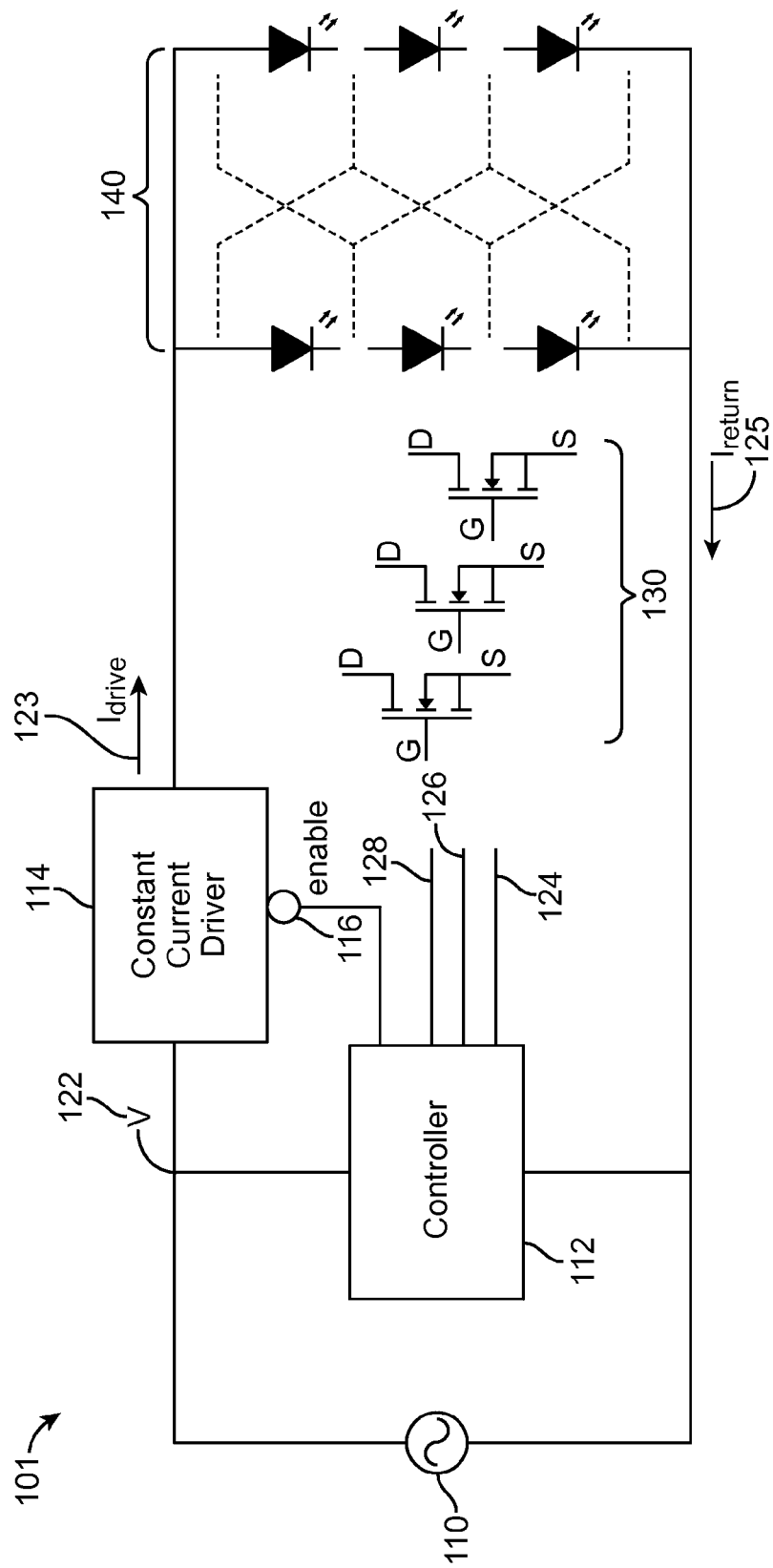
FIG. 1 shows a functional block diagram of a lighting assembly having a dynamically reconfigurable switching network.

The following preferred embodiments are directed to Light Emitting Diode ("LED") drivers and systems. LEDs exhibit substantially greater power efficiencies and operating lifetimes as compared with conventional light sources such as incandescent lamps. Traditionally, LEDs have been energized using direct current ("DC") power supplies as LEDs only emit light when operated in a forward biased configuration. This is often not a preferred configuration as DC power supplies are bulky, expensive, and are typically less reliable than the LEDs. Moreover, electric utility companies ideally prefer loads which exhibit power factors near one and total harmonic distortion of current ("THDi") of near zero. But real-world electrical loads do not meet the expectations of the utility companies. Switching mode power supply driven loads may contribute to these problems. Thus a non-switching mode power supply is better for the environment, users, and utility companies as they exhibit better performance. Hence, energizing LEDs with alternating current ("AC") power sources may be preferred in many applications.

Often LED lamps are used for AC applications in which the LED lamps comprise multiple individual LEDs interconnected typically in electrical series. In some applications, several LED lamps may be interconnected to form a lighting apparatus. Design considerations exist for the type of circuit used to interconnect the LED lamps. LED lamps may be interconnected in electrical series, parallel, or a combination of series and parallel. LED lamps electrically interconnected in parallel perform best when the AC voltage is near the forward voltage of the LED lamp. While this configuration increases the amount of time that the LED lamps are illuminated within a power cycle, the peak light intensity is not maximized because each LED only receives a fraction of the overall drive current. On the other hand, LED lamps interconnected in series provide a maximized peak light intensity because each LED receives the total drive current, but the LED lamps are illuminated for only a fraction of the power cycle.

In one or more embodiments, a lighting system that can dynamically reconfigure the circuitry energizing LED lamps and switch between largely parallel circuits and largely serial circuits is contemplated. In a preferred embodiment, the lighting system comprises an AC power source, a controller, a dynamically reconfigurable switching network, and LED lamps. The switching network receives the AC current and distributes the current to the LED lamps. The controller monitors the instantaneous voltage of the AC power source and sends control signals to the switching network. When the instantaneous voltage of the AC power source is low, the switching network interconnects the LED lamps in a largely parallel configuration. As the instantaneous voltage increases, the switching network reconfigures and interconnects the LED lamps with increasingly serial configurations. As the instantaneous voltage begins to decrease, the switching network reconfigures and interconnects the LED lamps back to a largely parallel configuration.

In an embodiment, a switching network may change from largely parallel interconnections to largely serial interconnections by varying the number of parallel branches in a circuit. Typically, an AC power source provides a live "hot" current to a circuit and receives a return "neutral" current from the circuit. A branch is an electrical pathway that receives the live current and returns the return current. Circuits with several branches are largely parallel in nature, and circuits with few branches or one branch are largely serial in nature. Largely parallel circuits would include multiple lamps each connected to the live and return current directly, and largely serial circuits would include multiple lamps connected in series where only one lamp receives the live current directly from the AC power source and only one lamp outputs the neutral current back to the AC power source.

Hence, in a preferred embodiment, when the instantaneous voltage of the AC power source is low, the switching network configures the LED lamps into multiple parallel branches. As the instantaneous voltage increases, the driver reconfigures the circuitry by decreasing the number of parallel branches. The total voltage drop for each branch is typically matched to that of the other branches. Hence, there are typically an equal number of LED lamps in each of the branches. Each of the LED lamps is electrically connected with the other LED lamps in all of the configurations of the switching network. As used herein and as commonly known in the art, LEDs include semiconductor and organic (i.e. OLED) electroluminescent devices. LED lamps may refer to devices having multiple interconnected individual LEDs. Reference made herein to an LED or an LED lamp herein shall not be construed as being limited to an individual or multiple LEDs respectively. It shall be understood that terms LED and LED lamps may be interchangeable and that reference to an LED may also refer to an LED lamp, and reference to an LED lamp may also refer to an LED. Reference is made herein to 120 and 240 volt AC power sources. This also should not be taken as being limiting in nature as other power sources such as direct current sources and alternating current sources having other voltage and frequency ranges are contemplated in one or more embodiments.

FIG. 1 shows an LED lighting system 101 having a power source 110, a controller 112, a constant current source 114, a dynamically configurable switching network 130 represented by MOSFETs, and a network of multiple LEDs or LED lamps 140. The power source 110 may be a direct current or alternating current power supply in preferred embodiments. The AC power source 110 may be 120 Volts, 240 Volts or 85-277 Volts (Universal). The system 101 may further comprise a bridge rectifier (shown in FIG. 8 for example) coupled to an AC power source 110 to provide pulsed DC current to the constant current source 114. The controller 112 is coupled to and monitors the instantaneous voltage V 122 of the AC power supply 110. The power source 110 provides a live feed current and receives a neutral return current. The power source 110 providing AC power has a power cycle in which the voltage varies sinusoidally from a peak of approximately −170 volts to approximately +170 volts for a 120 volt source. The controller 110 monitors the instantaneous voltage 122 during the power cycle and provides control signals 124, 126, and 128 during time periods based on the power cycle.

The constant current source 114 is coupled to the power source 110 and receives the feed current and provides an LED drive current $I_{drive}$ 123. The constant current source 114 limits the LED drive current 123 to a maximum drive current. In one or more embodiments, the constant current source 114 has an enable input 116 which activates the constant current source 114. The constant current source 114 may limit the current based on control signals from the controller 112. In a preferred embodiment, the constant current source 114 varies the limits the current based on the value of voltage V 122 of the AC power source 110.

The switching network 130 comprises a plurality of single-pole, single-throw switches and a plurality of pathways coupling the LEDs and the switches in the switching network 130. Each switch comprises a Metal Oxide Semiconductor Field Effect Transistor (MOSFET) in an embodiment.

Figure 4A:
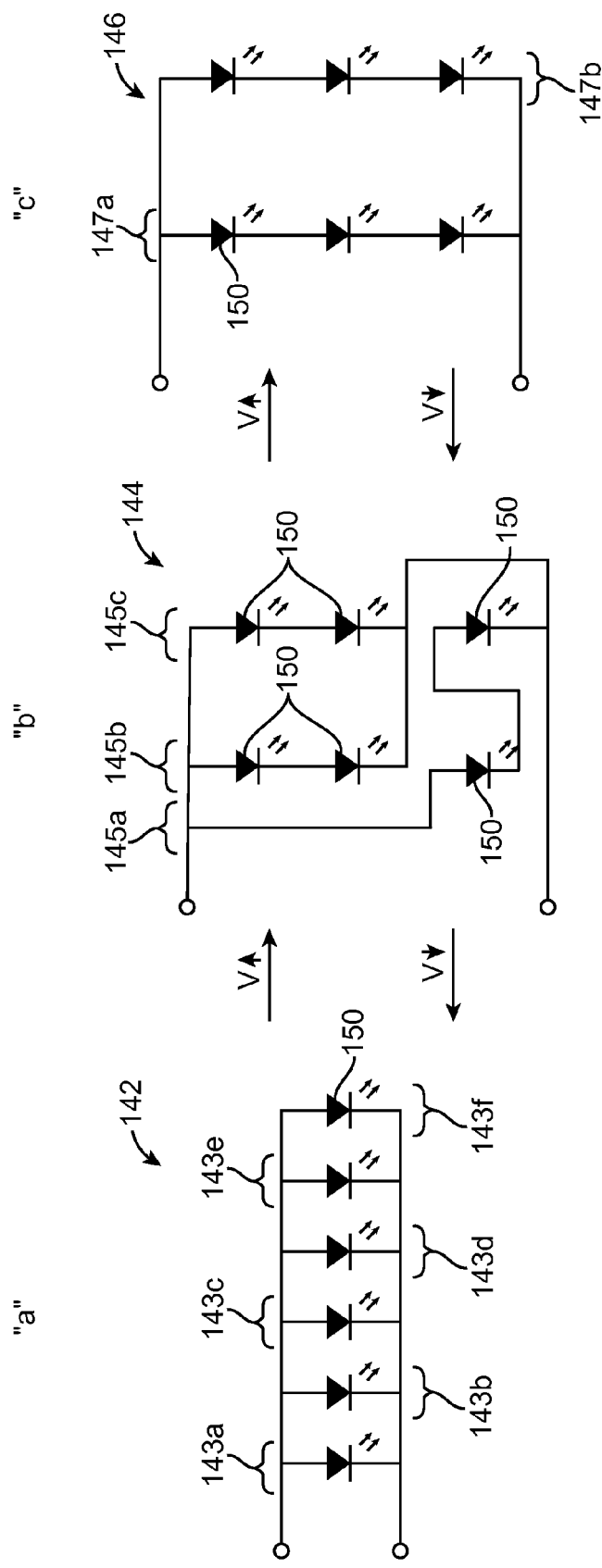
FIG. 4A depicts equivalent schematic circuit diagrams for the different modes of operation.

The dynamically reconfigurable switching network 130 receives the LED drive current $I_{drive}$ 123 and the control signals 124, 126, and 128. As shown in FIG. 4A, the switching network 130 is configured for electrically interconnecting LEDs or LED lamps 150 into at least one parallel branch, where each branch receives at least a portion of the LED drive current 123 and energizes the LEDs within the branch, and returns at least a portion of the return current to the AC power source 110. The sum of the return current from all of the branches is represented by $I_{return}$ 125. As discussed below, the switching network 130 has a first mode of operation in which the LEDs 150 are interconnected having a first number of branches, and a second mode of operation in which the LEDs 150 are interconnected having a second number of branches not equal to the first number of branches. The optical power of the LEDs or LED lamp 150 is generally proportional to the bias current passing through each LED 150. Hence LEDs 150 interconnected in parallel will exhibit a lower optical power because each LED only passes a fraction of the total drive current $I_{drive}$ 123, and LEDs interconnected in series will exhibit a higher optical power because the total drive current $I_{drive}$ 123 passes through each LED 150.

Figure 2:
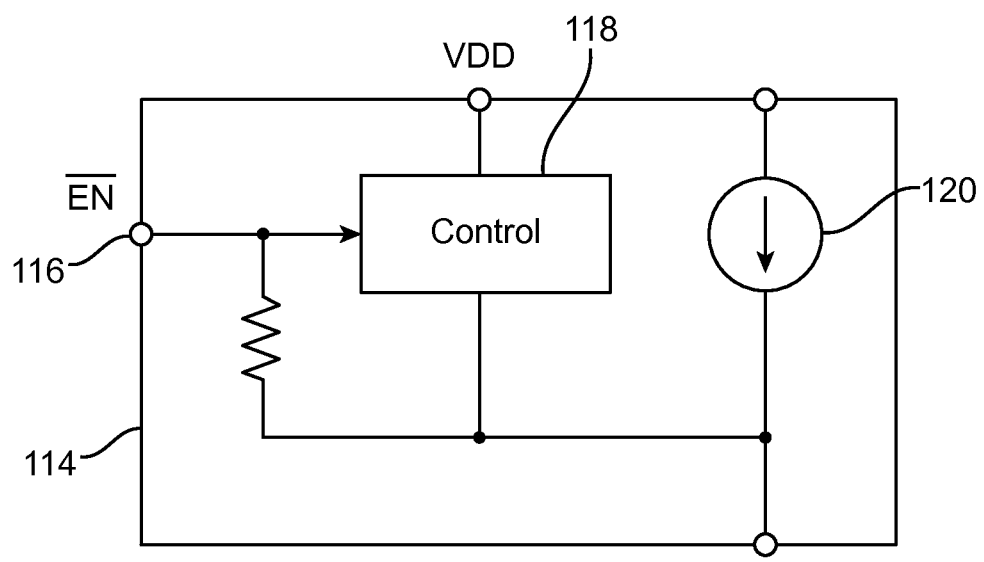
FIG. 2 is a schematic diagram of an exemplary constant current source.

FIG. 2 is a schematic diagram of an exemplary constant current source 114. The constant current source 114 has an enable input 116 coupled to the internal controller 118. The controller 118 activates and sets the internal current source 120. The constant current source 114 may be a low dropout regulator, and have working voltages in the range of typically 5 to 200 volts. The constant current source 114 may have drive currents in the range typically 10 to 150 milli-amperes in an embodiment. The constant current source 114 may be either a high-side or low-side regulator.

Figure 3:
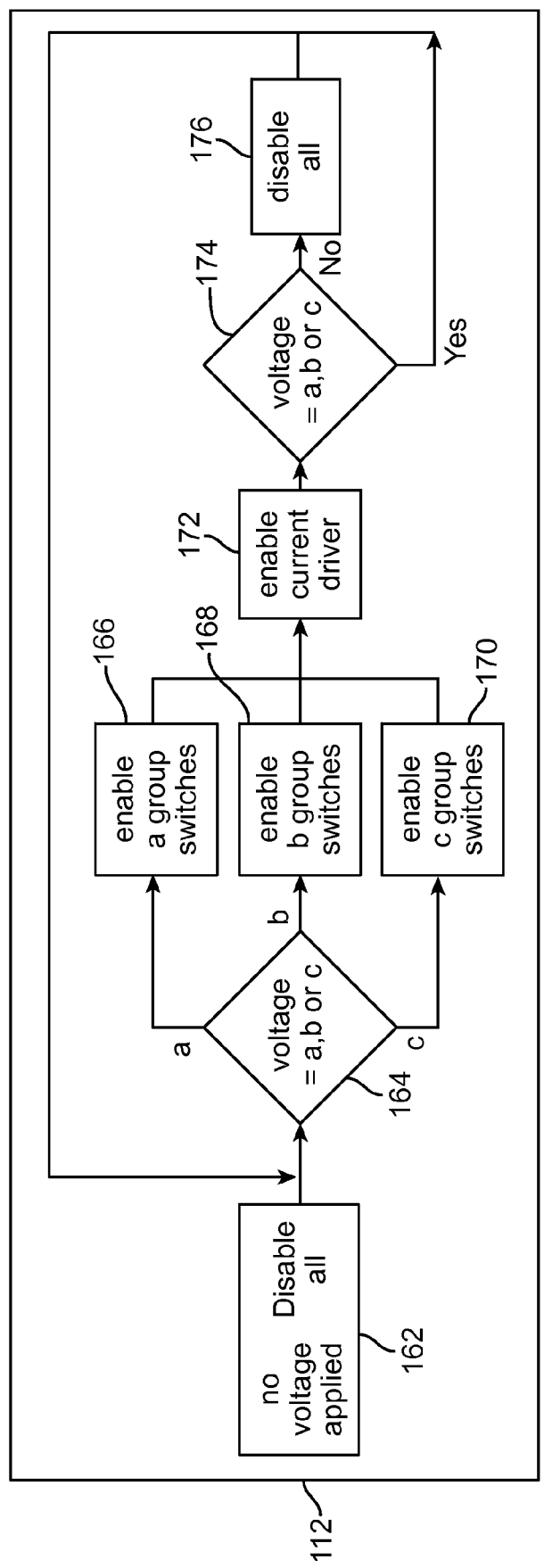
FIG. 3 is a functional block diagram of a controller in an embodiment.

FIG. 3 is a functional block diagram showing a flow chart for the controller 112 in an embodiment. The controller 112 is coupled to and monitors the instantaneous voltage V 122 of the power source 110. When the instantaneous voltage V 122 is near zero, the constant current source 114 is disabled and all of the switches are off (step 162). When the instantaneous voltage V 122 equals $V_a$, the "a" group of switches is enabled (steps 164 and 166). Likewise when the instantaneous voltage V 122 equals $V_b$, the "b" group of switches is enabled (steps 164 and 168), and when the instantaneous voltage V 122 equals $V_c$, the "c" group of switches is enabled (steps 164 and 170). After the appropriate switches are enabled, the constant current source 114 is enabled (step 172). When the instantaneous voltage V 122 does not equal $V_a$, $V_b$, or $V_c$, the switches 130 and constant current source 114 are all disabled (steps 174 and 176).

FIG. 4A depicts equivalent schematic diagrams of circuits 142, 144, and 146 for the different modes of operation. Each circuit 142, 144, and 146 has six LED lamps 150 each having a forward voltage of approximately 50 volts and forward current of 20 mA in an embodiment. The switching network 130 changes modes of operation in response to the control signals 124, 126, and 128 from the controller 112. The controller 110 provides control signals 124, 126, and 128 based on the instantaneous voltage V 122 of the power source 110. The circuit 142 is the configuration when the "a"

group of switches are activated when the voltage is 50 volts, the circuit 144 is the configuration when the "b" group of switches are activated when the voltage is 100 volts, and the circuit 146 is the configuration when the "c" group of switches are activated when the voltage is 150 volts.

The switching network 130 has a first mode of operation in which all of the LEDs 150 are interconnected having six branches 143a, 143b, 413c, 143d, 143e and 143f as shown in circuit 142. Each branch 143a-143f has one LED lamp 150. The switching network 130 has a second mode shown in circuit 144 in which all of the LEDs 150 are interconnected having three branches 145a, 145b and 145c. Each branch 145a, 145b and 145c has two LED lamps 150. The switching network also has a third mode shown in circuit 146 in which the LEDs 150 are on two branches 147a and 147b having three LED lamps 150. As shown, the switching network 130 starts with circuit 142 when the instantaneous voltage V 122 is low and reconfigures to circuits 144 and 146 when the instantaneous voltage V 122 increases, and then reconfigures from circuit 146 back to circuits 144 and 142 when the instantaneous voltage V 122 decreases during the power cycle. For each mode of operation, each branch comprises the same number of LED lamps 150.

Figure 4B:
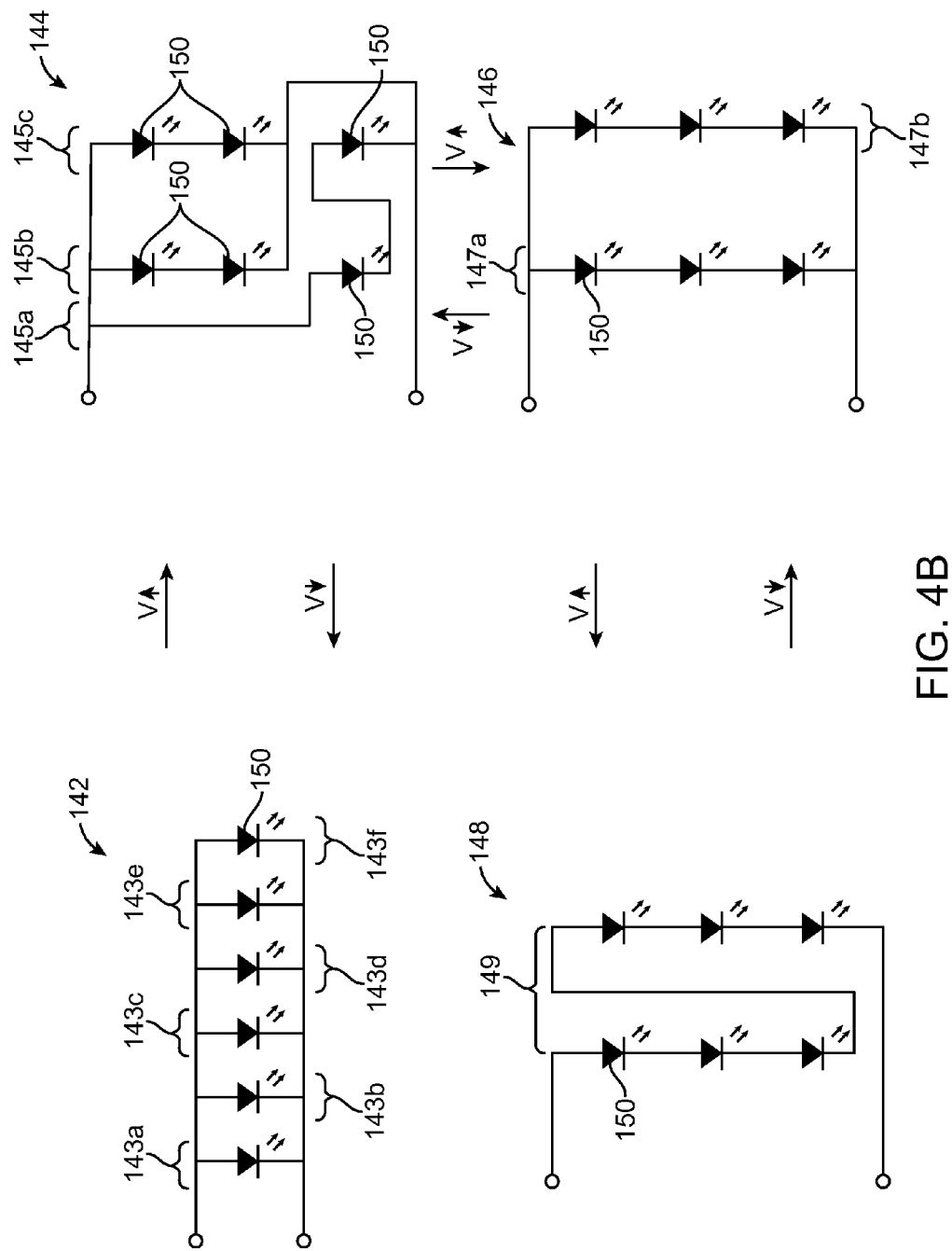
FIG. 4B depicts equivalent schematic diagrams for a four stage dynamically reconfigurable switching network.

FIG. 4B depicts equivalent schematic diagrams of circuits 142, 144, 146, and 148 for the different modes of operation. Each circuit 142, 144, 146, and 148 has six LED lamps 150 each having a forward voltage of approximately 50 volts and forward current of 20 milliamperes in an embodiment. The switching network 130 changes modes of operation in response to the control signals from the controller 112. In one or more embodiments, the controller 110 provides 4 control signals based on the instantaneous voltage V 122 of the power source 110. When the voltage V 122 is greater than or equal to 50 Volts but less than 100 Volts, the switching network 130 configures to form the equivalent circuit 142 having 6 branches 143a-143f having one LED 150 per branch. When the voltage V 122 is greater than or equal to 100 Volts but is less than 150 Volts, the switching network 130 reconfigures to form the equivalent circuit 144 having three branches 145a-145c having two LEDs 150 in each branch. As the voltage V 122 reaches or exceeds 150 Volts but is less than 250 Volts, the switching network 130 reconfigures to form the equivalent circuit 146 having two branches 147a and 147b having three LEDs 150 in each branch. When the voltage V 122 is greater than or equal to 250 Volts but less than 400 Volts, the switching network 130 reconfigures to form the equivalent circuit 148 having six LEDs 150 in the branch 149. The switching network reconfigures to the circuits 146, 144, and 142 as the voltage V 122 falls below the third, second, and first threshold voltages. While the threshold voltages listed above assume that the LED lamps have a forward voltage of 50 Volts, other LEDs or LED lamps having differing forward voltages are contemplated in one or more embodiments. A four stage reconfigurable network may provide greater power efficiencies. Switching networks having two stages, three stages, four stages, and other multiple stages are contemplated in one or more embodiments.

Figure 4C:
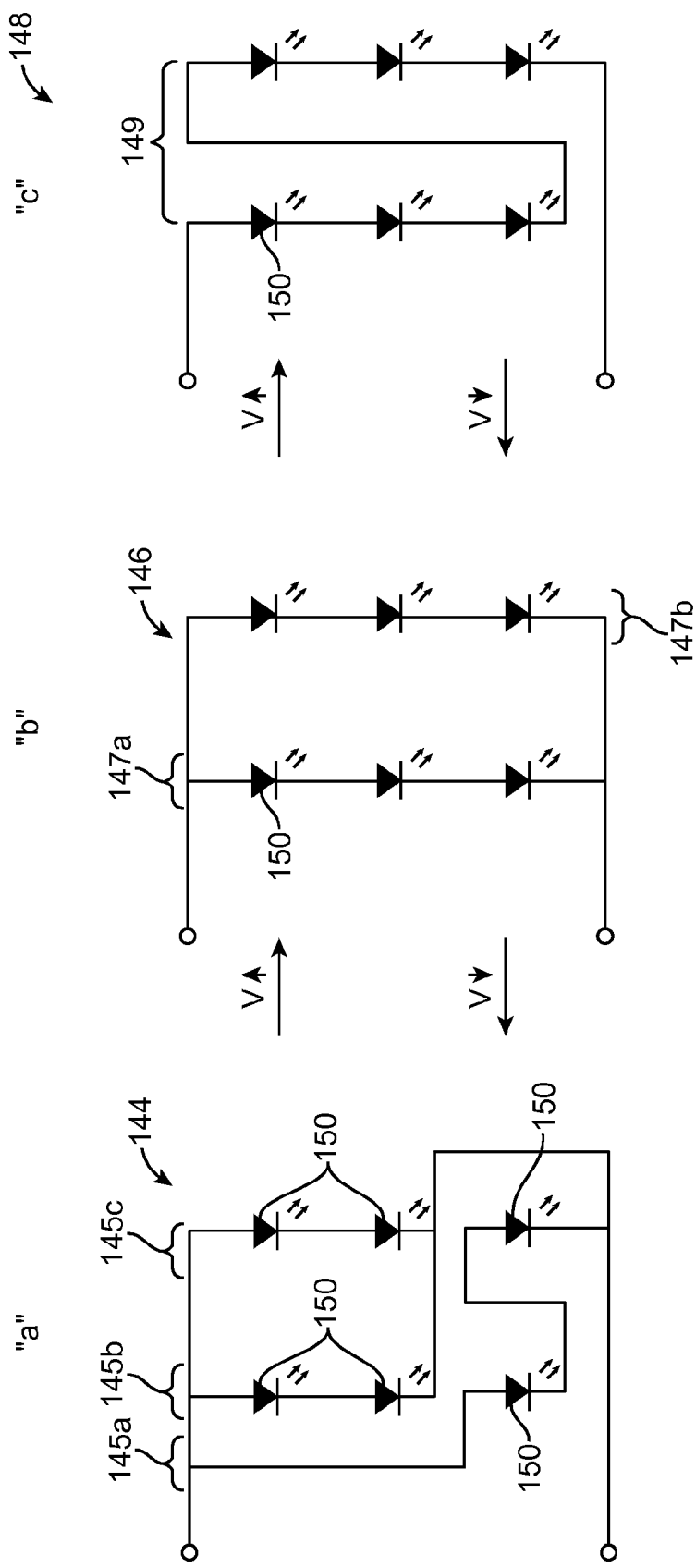
FIG. 4C depicts equivalent schematic circuit diagrams for the different modes of operation in an embodiment.

FIG. 4C depicts equivalent schematic diagrams of circuits 144, 146, and 148 for the different modes of operation. Each circuit 144, 146, and 148 has six LED lamps 150 each having a forward voltage of approximately 25 volts and forward current of 20 mA in an embodiment. The switching network 130 changes modes of operation in response to the control signals 124, 126, and 128 from the controller 112. The controller 110 provides control signals 124, 126, and 128 based on the instantaneous voltage V 122 of the power source 110. The circuit 144 is the configuration when the "a" group of switches are activated when the voltage is 50 volts, the circuit 146 is the configuration when the "b" group of switches are activated when the voltage is 75 volts, and the circuit 148 is the configuration when the "c" group of switches are activated when the voltage is 150 volts. In one or more embodiments, the circuits 144, 146, and 148 may be employed for 120 Volt applications.

The switching network 130 has a first mode of operation in which all of the LEDs 150 are interconnected having three branches 145a, 145b, and 145c as shown in circuit 144. Each branch 145a-145c has two LED lamps 150. The switching network 130 has a second mode shown in circuit 146 in which all of the LEDs 150 are interconnected having two branches 147a and 147b. Each branch 147a and 147b has three LED lamps 150. The switching network also has a third mode shown in circuit 148 in which the LEDs 150 are on one branch 149 having six LED lamps 150. As shown, the switching network 130 starts with circuit 144 when the instantaneous voltage V 122 is low and reconfigures to circuits 144 and 146 when the instantaneous voltage V 122 increases, and then reconfigures from circuit 148 back to circuits 146 and 144 when the instantaneous voltage V 122 decreases during the power cycle. For each mode of operation, each branch comprises the same number of LED lamps 150.

Figure 5:
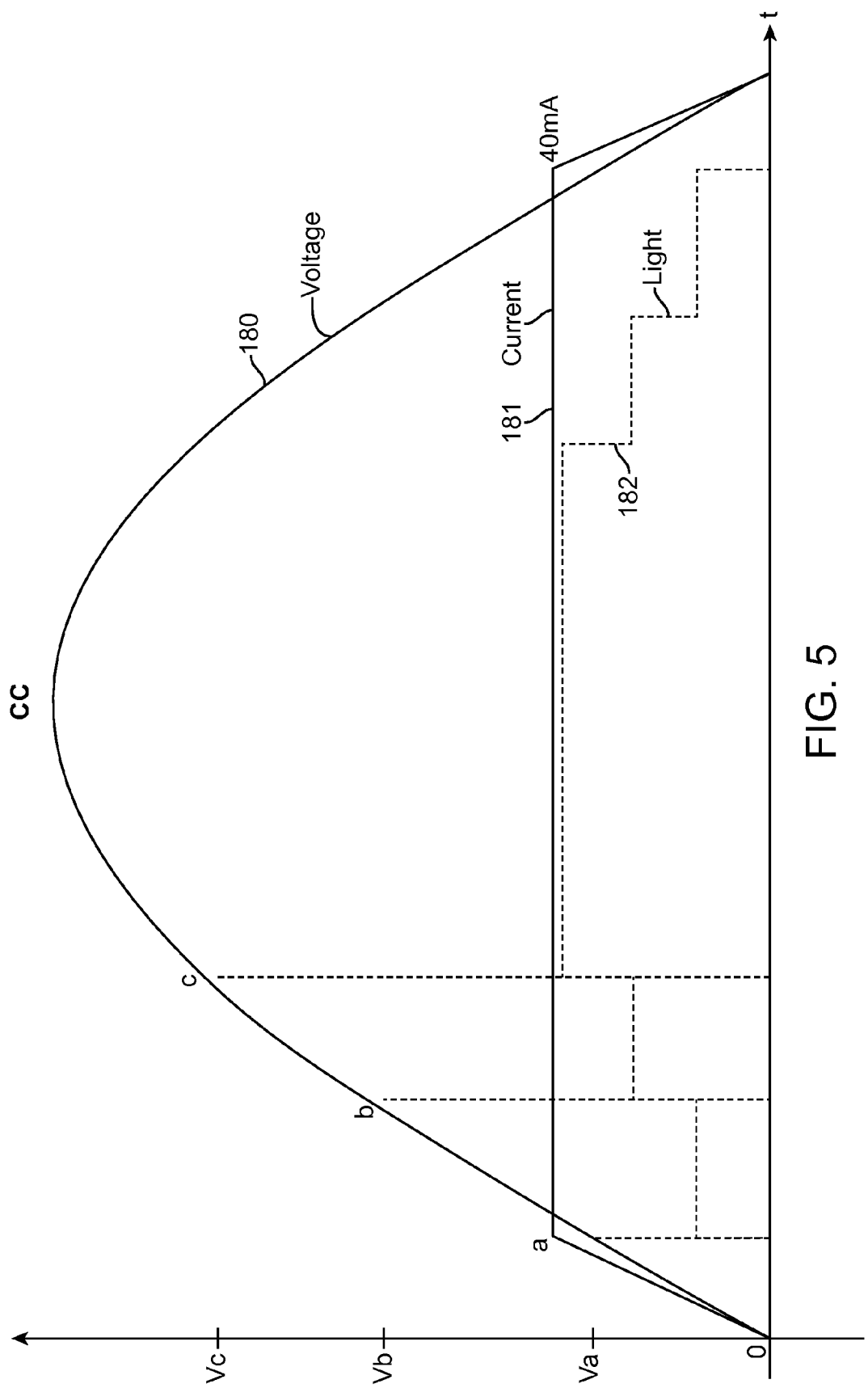
FIG. 5 is an exemplary graph of the voltage, current, and optical power of light for an embodiment employing a constant current source ("CC").

FIG. 5 is an exemplary graph of the voltage 180, current 181, and the optical power of the light emission 182 for an embodiment employing a constant current source 114 where the current $I_{drive}$ 123 is set for only one value throughout the power cycle ("CC"). Note that voltage 180 represents the graph of the instantaneous voltage 122 and follows a half-sine wave characteristic of a full-wave rectified AC signal.

In a CC exemplary embodiment, the current source 114 provides a constant current $I_{drive}$ 123 of 40 milliamperes. When the voltage 180 is below $V_a$, the constant current source 114 is disabled in an embodiment. Alternatively, the constant current source 114 may be enabled in this voltage range; however, the LEDs or LED lamps 150 would not emit substantial light as the voltage is below the forward voltage drop for the LEDs 150. Hence, the current 181 may increase to the maximum level when voltage 180 V meets or exceeds $V_a$ and stays constant until the voltage 180 drops below $V_a$.

Once the voltage 180 rises to and above $V_a$, the "a" group of switches is engaged such that the switching network 130 exhibits a circuit to that shown in circuit 142 for the first mode of operation. Referring to FIG. 4A, the branches 143a, 143b, 143c, 143d, 143e, and 143f would each carry one sixth of the drive current $I_{drive}$ or $I_{drive}/6$. Since the optical power of an LED is generally directly proportional to the current flowing through the LED, each LED 150 would therefore emit only a fraction of the maximum brightness.

When the voltage 180 rises to and above $V_b$, the "b" group of switches is engaged such that the switching network 130 exhibits a circuit to that shown in circuit 144 for the second mode of operation. Referring again to FIG. 4A, the branches 145a, 145b, and 145c would carry one third of the drive current $I_{drive}$ or $I_{drive}/3$. Hence, since the optical power of an LED is generally proportional to the current passing through the LED 150, each LED 150 would exhibit a greater optical power than the LEDs 150 in the "a" circuit 142, but would not realize full brightness.

When the voltage 180 rises to and above $V_c$, the "c" group of switches is engaged such that the switching network 130 exhibits a circuit to that shown in circuit 146 for the third mode of operation. Referring again to FIG. 4A, the branch 147a and 147b each carries half of the drive current $I_{drive}$ or $I_{drive}/2$ in one or more embodiments. Hence, each LED 150 would emit a greater optical power. This step-wise increase in current passing through the LEDs 150 from $I_{drive}/6$ ("a" group) to $I_{drive}/3$ ("b" group) to Idrive/2 ("c" group) accounts for the step-wise increase in the optical power of the LEDs 150. This configuration may have reduced costs of manufacture as a result of having only one constant current source.

The switching network 130 continues to operate in the third mode of operation until the voltage 180 falls below $V_c$, at which point the network 130 returns to the second mode of operation with the "b" switches operating. When the voltage 180 falls below $V_b$, the network 130 returns to the first mode of operation with the "a" switches operating.

Figure 6:
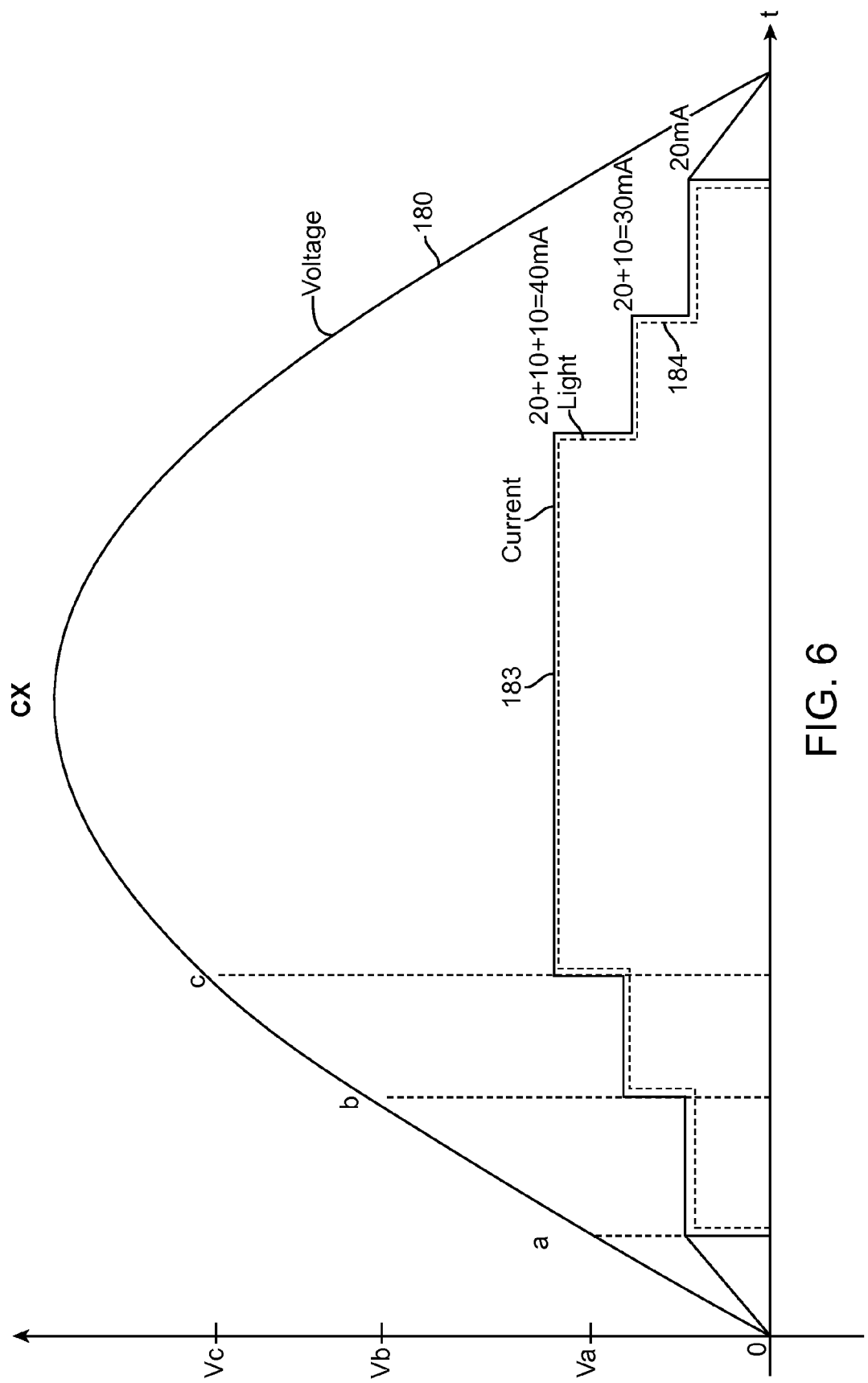
FIG. 6 is an exemplary graph of the voltage, current, and optical power of light for an embodiment employing a varying current source ("CX") in one or more embodiments.

FIG. 6 is an exemplary graph of the voltage 180, current 183, and optical power 184 for an embodiment employing a varying current source in one or more embodiments ("CX"). The curve of the optical power of the light 184 is slightly offset from the current 183 for illustration purposes only. In this embodiment, the switch network 130 performs as discussed above with respect to the single current embodiment shown in FIG. 5. However, the constant current source 110 varies the drive current $I_{drive}$ 123 as shown. When in the first mode of operation where voltage 180 is equal to or above $V_a$, the current source outputs 20 milliamperes in an embodiment. During the second mode of operation where voltage 180 is equal to or above $V_b$, 30 milliamperes drives the LEDs 150. During the third mode of operation where voltage 180 is equal to or above $V_c$, 40 milliamperes drive the LEDs 150. Since the optical power generated by LEDs 150 is generally directly proportional to the drive current passing through each LED 150, the total optical power increases from the first mode to the second mode, and increases from the second mode to the third mode. This configuration exhibits reduced THDi compared to that of the configuration shown in FIG. 5.

Figure 7:
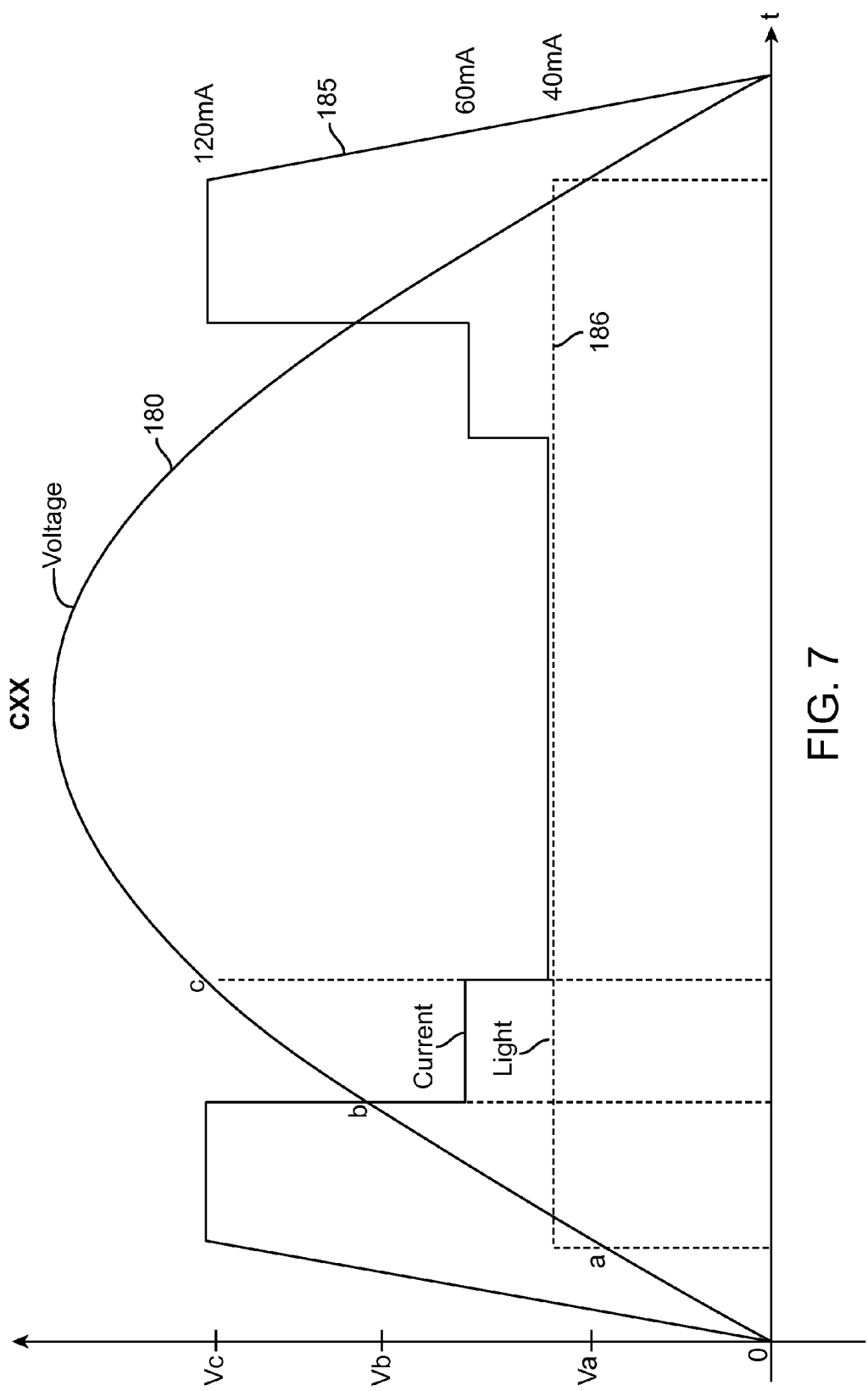
FIG. 7 is an exemplary graph of the voltage, current, and optical power of light for an embodiment employing a varying current source ("CXX") in one or more embodiments, where the power of light is constant in this embodiment, similar to that of light driven with DC current.

FIG. 7 is a CXX exemplary graph of the voltage, current, and light emission for an embodiment employing a varying current source in one or more embodiments. In this embodiment, the switch network 130 performs as discussed above with respect to the single current embodiment shown in FIG. 5. However, the constant current source 114 varies the drive current as shown. When in the first mode of operation, the current source outputs 120 milliamperes in an embodiment. Referring to circuit 142 in FIG. 4A, in this mode each branch 143*a*-143*f* would pass 20 milliamperes of current. During the second mode of operation, 60 milliamperes drives the LEDs 150. Referring back to circuit 144 in FIG. 4A, each branch 145*a*, 145*b*, and 145*c* would each pass 20 milliamperes of current. During the third mode of operation, 40 milliamperes drive the LEDs 150. Referring back to circuit 146 in FIG. 4A, each branch of LED 150 would receive 20 milliamperes of current.

Hence, each LED 150 receives exactly the same drive current throughout most of the power cycle, and therefore the LEDs 150 illuminate with a nearly constant optical power or similar to that of DC driving but with all solid state parts. This configuration is suitable for applications requiring high efficacy.

Figure 8:
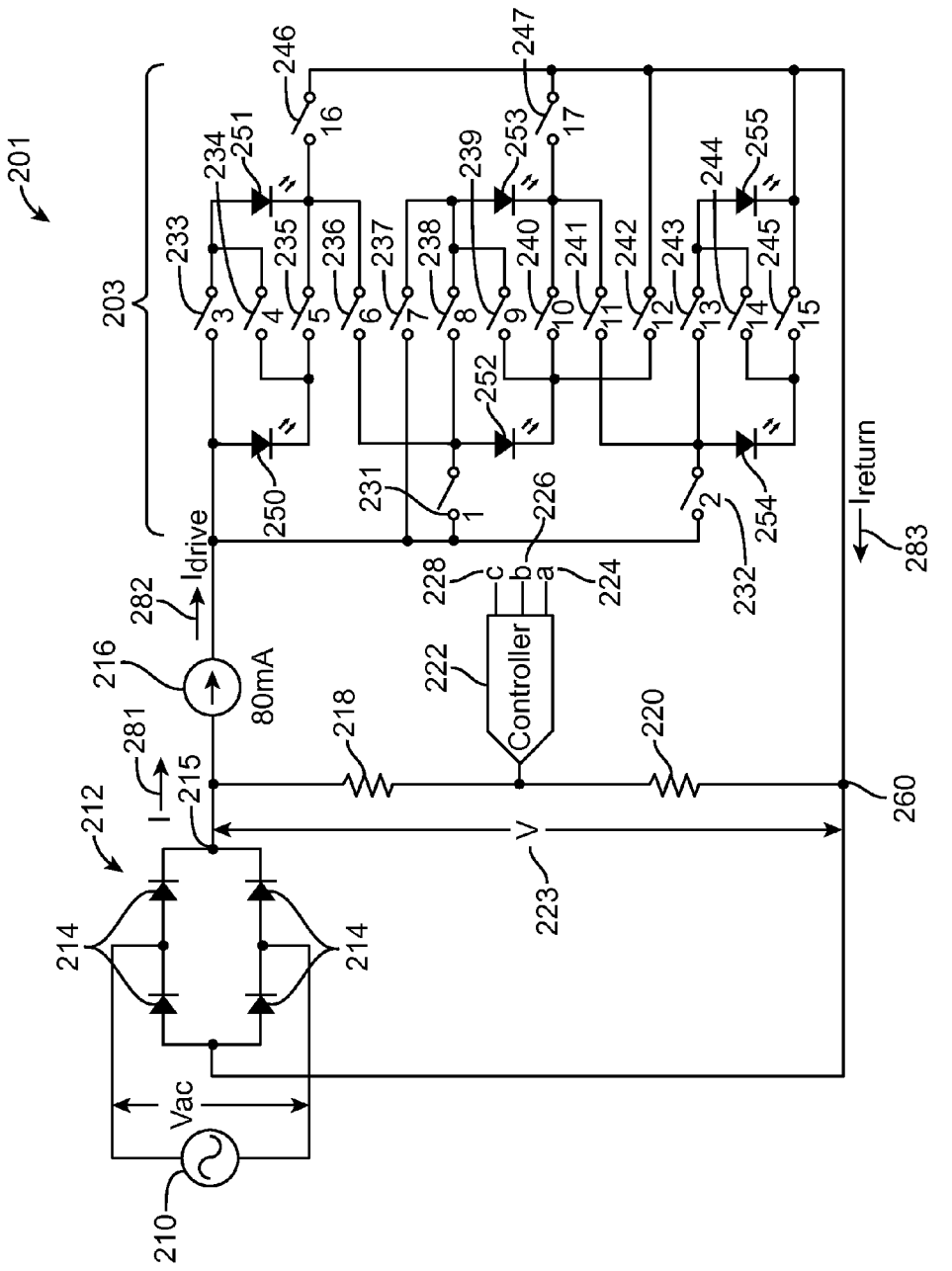
FIG. 8 is circuit diagram of a lighting system employing a dynamically reconfigurable switching network.

FIG. 8 is a CC circuit diagram of a lighting system 201 employing a dynamically reconfigurable switching network 203 with a single constant current source 216. In one or more embodiments, the lighting system 201 may exhibit voltage 284, current 285, and light 286 characteristics shown in FIG. 15. Embodiments may provide reduced cost lighting systems. In one or more embodiments, the brightness of the lighting circuit 201 may be altered with standard electrical dimmers, and the constant current source may have a power-up enable function. The lighting system 201 may be fabricated on a single die having both the LEDs and the drivers. The lighting system 201 may be suitable for COB (Chip On Board) production.

The lighting system 201 is coupled to an AC power source 210. The AC current is coupled to a full-wave bridge rectifier 212 comprising 4 diodes 214 as shown. The output of the bridge rectifier 215 outputs a full-wave rectified sinusoidal current or pulsed DC current I 281. A constant current source 216 receives the pulsed DC current signal I 281 and outputs an LED drive current $I_{drive}$ 282 which limits the maximum current to 80 milliamperes in an embodiment.

A controller 222 monitors the instantaneous voltage V 223 out of the bridge rectifier 212 using a voltage divider comprising resistors 218 and 220. The instantaneous voltage V 223 is the voltage between the output of the bridge rectifier 215 and the return line 260 at each moment of time. The controller 222 provides at least three control signals 224 ("a"), 226 ("b"), and 228 ("c") to the switches 231-247 based on the instantaneous voltage V 223 and the logic table shown in Table I. In an embodiment, the reconfiguration of the modes of operation is performed sequentially and enables the LEDs to illuminate for the vast majority of the power cycle. Commercially available devices which may provide related functionality to the above mentioned devices may include a Fairchild FSAR001 AC-DC Linear Regulator, a Texas Instruments LM3914 DOT/Bar Display Driver, a Supertex 3-Channel, 20 mA, Linear LED Driver, and n-channel enhancement mode MOSFETs.

As shown in Table I, in an embodiment, the control signal 224 ("a") engages the "a" group of switches (231, 232, 233, 235, 238, 240, 243, 245, 246, and 247) when the instantaneous voltage V 223 is in range $V_a \leq V < V_b$. The control signal 226 ("b") engages the "b" group of switches (231, 232, 234, 239, 244, 246, and 247) when the instantaneous voltage V 223 is in range $V_b \leq V < V_c$. The control signal 226 ("c") engages the "c" group of switches (234, 236, 237, 241, 242, and 244) when the instantaneous voltage V 223 is in range $V_c \leq V$. In an embodiment, at most one of the control signals 224, 226, and 228 may be engaged at a time.

TABLE I

Switch Network Logic Table

| SW | Label | "a" group | "b" group | "c" group |
|---|---|---|---|---|
| 1 | 231 | ON | ON | — |
| 2 | 232 | ON | ON | — |
| 3 | 233 | ON | — | — |
| 4 | 234 | — | ON | ON |
| 5 | 235 | ON | — | — |
| 6 | 236 | — | — | ON |
| 7 | 237 | — | — | ON |
| 8 | 238 | ON | — | — |
| 9 | 239 | — | ON | — |
| 10 | 240 | ON | — | — |
| 11 | 241 | — | — | ON |
| 12 | 242 | — | — | ON |
| 13 | 243 | ON | — | — |
| 14 | 244 | — | ON | ON |
| 15 | 245 | ON | — | — |
| 16 | 246 | ON | ON | — |
| 17 | 247 | ON | ON | — |

Note:
"—" signifies switches are OFF.

The switches 231-247 form a switching network 203 that interconnect the LEDs or LED lamps 250-255. The switching network 203 is dynamically reconfigurable to have three modes of operation having differing number of branches that correspond with the control signals 224, 226, and 228. A branch is an electrical pathway that receives at least a portion of the drive current $I_{drive}$ 281 directly from the constant current source 216 and returns at least a portion of the return current $I_{return}$ 283 directly back to the bridge rectifier 212. No other components separate the branches of LEDs from the constant current source 216 or the bridge rectifier 212. Circuits with several branches are largely parallel in nature, and circuits with few branches or one branch are largely serial in nature. Largely parallel circuits would include multiple lamps each connected to the drive current $I_{drive}$ 282 and return current $I_{return}$ 283 directly, and largely serial circuits would include multiple lamps connected in series where only one lamp receives the drive current $I_{drive}$ 281 directly from constant current source 216 and only one lamp outputs the return current $I_{return}$ 283 back to the bridge rectifier 212.

In an embodiment, the switches 231-247 and the LEDs or LED lamps 250-255 are configured as follows. The output of the constant current source 216 provides the LED current drive $I_{drive}$ 282 to the anode of LED 250, the input of switch 233, the input of switch 237, the input of switch 231, and the input of switch 232. The cathode of LED 250 is connected to the inputs of switches 234 and 235. The outputs of switches 233 and 234 are connected to the anode of LED 251. The output of switch 235 is connected to the cathode of LED 251, the input of switch 246, and the output of switch 236.

In an embodiment, the output of switch 231 is connected to the input of switches 236 and 238, and the anode of LED 252. The output of switch 237 is connected to the output of switches 238 and 239, and the anode of LED 253. The cathode of LED 252 is connected to the inputs of switches 239, 240, and 242. The output of switch 232 is connected to the input of switches 241 and 243, and the anode of LED 254. The cathode of LED 254 is connected to the inputs of switches 244 and 245. The output of switch 241 is connected to the output of switch 240, the input of switch 247, and the cathode of LED 253. The output of switch 243 is connected to the output of switch 244 and the anode of LED 255. The output of switch 246 is connected to the outputs of switches 247, 242, and 245, and the cathode of LED 255 and provides the return current $I_{return}$ 283 back to the bridge rectifier 212.

Figure 9:
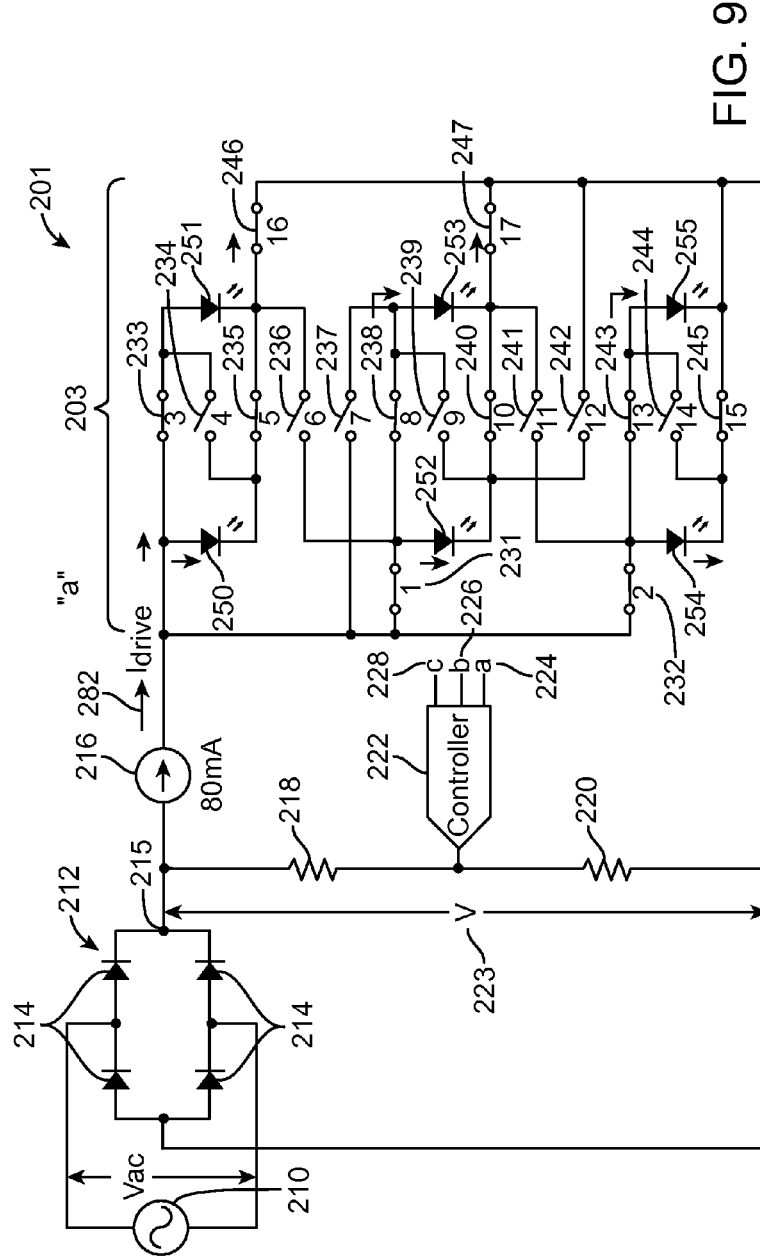
FIG. 9 is circuit diagram of a CC lighting system showing the current paths when the voltage meets or exceeds $V_a$.
Figure 10:
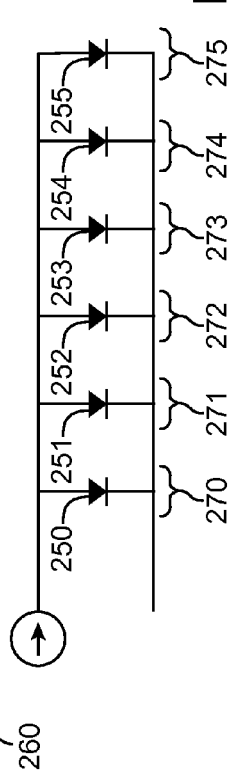
FIG. 10 depicts the equivalent diagram of the circuit depicted in FIG. 9.

FIG. 9 is circuit diagram of the lighting system in the first mode of operation showing the current paths when the voltage meets or exceeds $V_a$ but less than $V_b$. FIG. 10 depicts the equivalent diagram of the circuit depicted in FIG. 9. Switches 231, 232, 233, 235, 238, 240, 243, 245, 246, and 247 are closed when the voltage exceed $V_a$ but is less than $V_b$. The LED drive current $I_{drive}$ 282 from the constant current source 216 passes through LED 250 and switch 235, and then returns to the bridge rectifier 212 to form the first branch 270. Likewise, the switches 233 and 246, and the LED 251 form the second branch 271. Switches 231, 240, 247 and LED 252 form the third branch 272. Switches 231, 238, 247 and LED 253 form the fourth branch 273. Switches 232, 245, and LED 254 form the fifth branch 274. Switches 232, 243 and LED 255 form the sixth branch 275. All of the branches 270-275 are in parallel with each other branches, and each branch comprises a single LED or single LED lamp.

FIG. 11 is circuit diagram of the lighting system showing the current paths when the voltage meets or exceeds $V_b$. FIG. 12 depicts the equivalent diagram of the circuit depicted in FIG. 11. Switches 231, 232, 234, 239, 244, 246, and 247 are closed when the voltage exceed $V_b$ but is less than $V_c$. The LED drive current $I_{drive}$ 282 from the constant current source 216 passes through LEDs 250, switch 234, LED 251, switch 246, and then returns to the bridge rectifier 212 to form the first branch 276. Likewise, the switch 231, LED 252, switch 239, LED 253, and switch 247 form the second branch 277. Switch 232, LED 254, switch 244, and LED 255 form the third branch 278. All of the branches 276-278 are in parallel with each other branches, and each branch comprises two LEDs or LED lamps.

Figure 13:
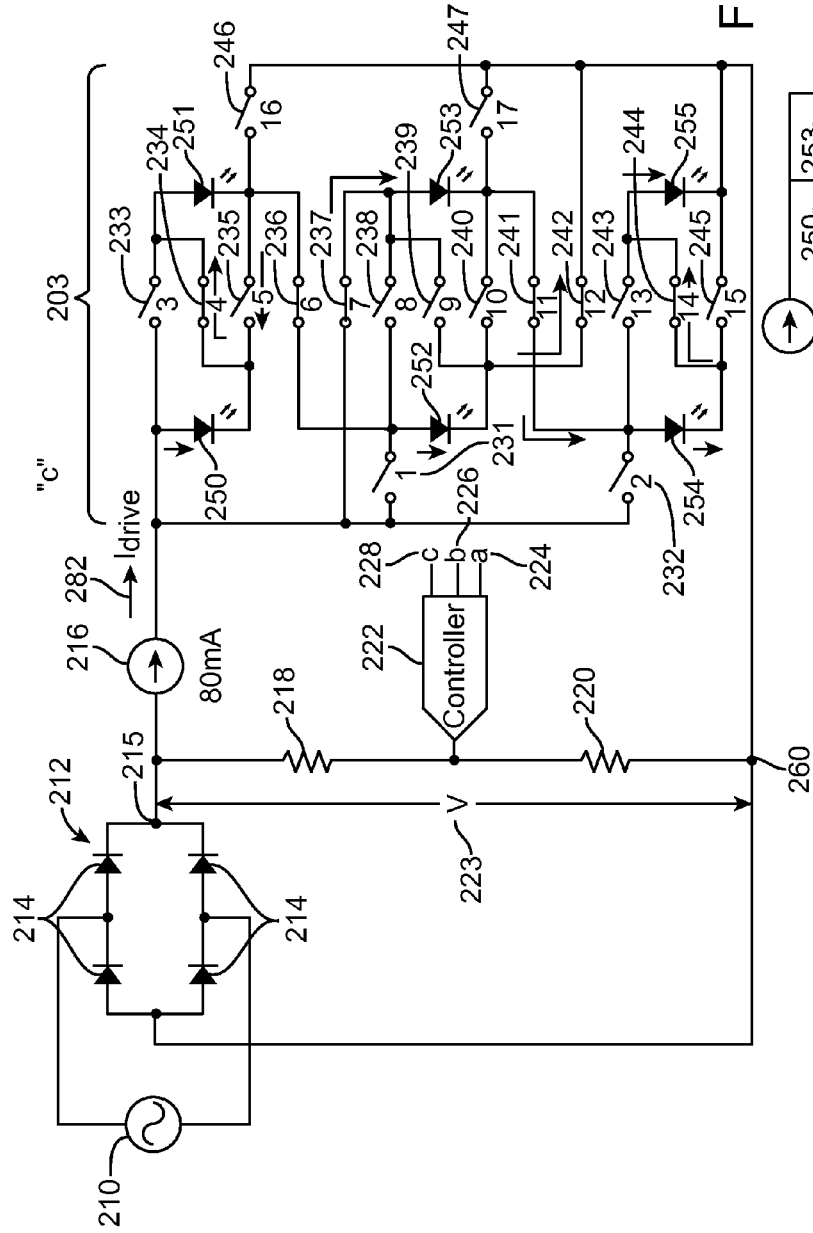
FIG. 13 is circuit diagram of a CC lighting system showing the current paths when the voltage meets or exceeds $V_c$.
Figure 14:
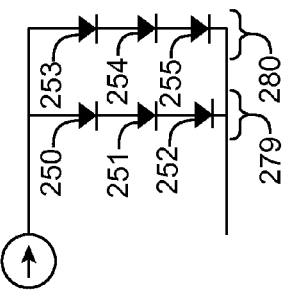
FIG. 14 depicts the equivalent diagram of the circuit depicted in FIG. 13.

FIG. 13 is circuit diagram of the lighting system showing the current paths when the voltage meets or exceeds $V_c$. FIG. 14 depicts the equivalent diagram of the circuit depicted in FIG. 13. The LED drive current $I_{drive}$ 282 from the constant current source 216 passes through LEDs 250, switch 234, LED 251, switch 236, LED 252, and switch 242 and then returns to the bridge rectifier 212 to form the first branch 279. Likewise, the switch 237, LED 253, switch 241, LED 254, switch 244, and LED 255 form the second branch 280. All of the branches 279-280 are in parallel with each other branches, and each branch comprises three LEDs or LED lamps.

Figure 15:
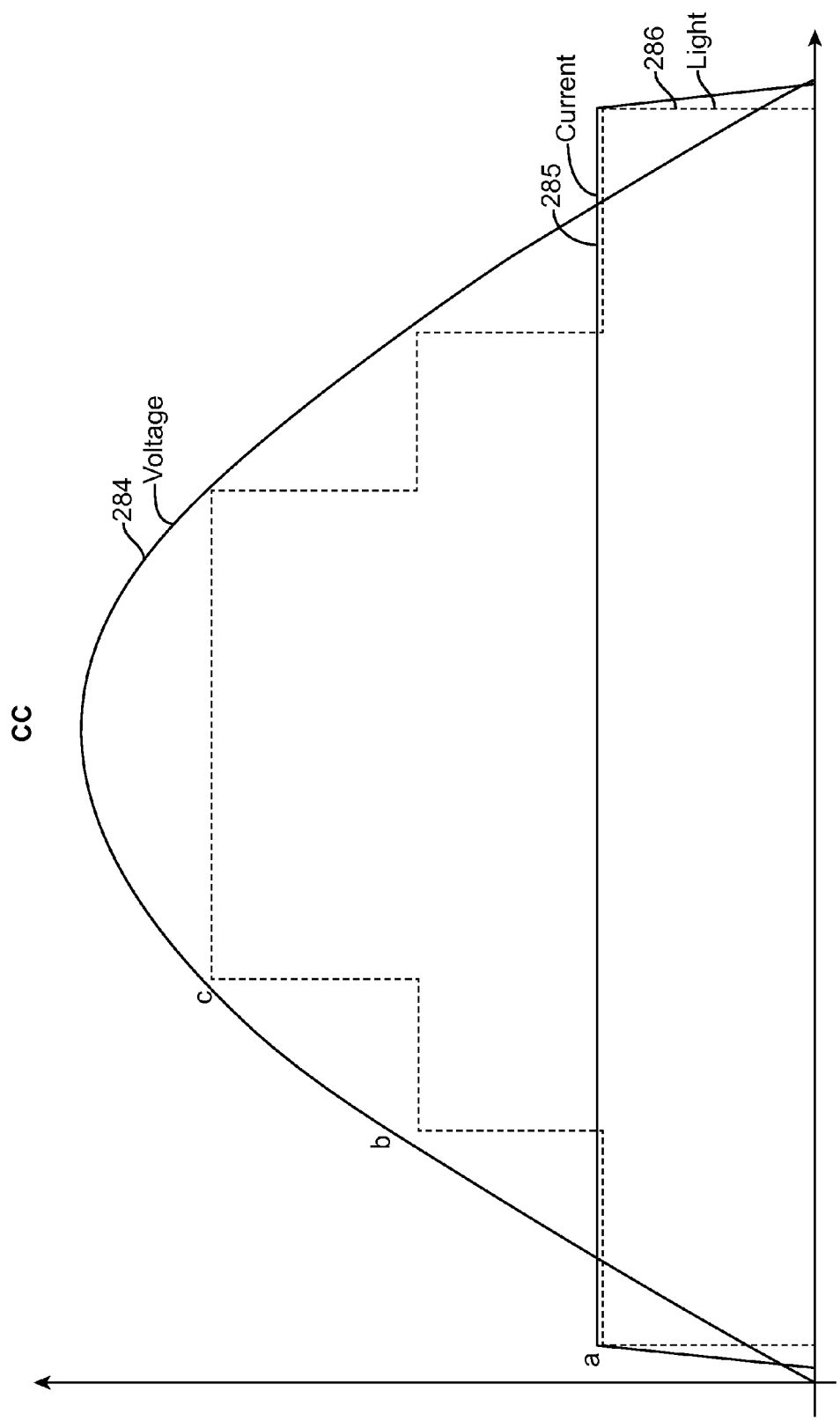
FIG. 15 is exemplary graph of the voltage, current, and optical power for an embodiment employing a constant current source in one or more embodiments.

FIG. 15 is an exemplary graph of the voltage 284, current 285, and optical power of the light emission 286 for the lighting system 201 shown in FIGS. 8, 9, 11, and 13 employing a constant current source 216 where the current $I_{drive}$ 282 is set for only one value throughout the power cycle. Note that voltage 284 represents the graph of the instantaneous voltage 223 and follows a half-sine wave characteristic of a full-wave rectified AC signal.

In an exemplary embodiment, the current source 216 provides a constant current $I_{drive}$ 282 of 80 milliamperes. When the voltage 284 is below $V_a$, the constant current source 216 is disabled in an embodiment. Alternatively, the constant current source 216 may be enabled in this voltage range; however, the LEDs or LED lamps 250-255 would not emit substantial light as the voltage is below the forward voltage drop for the LEDs 250-255. Hence, the current $I_{drive}$ 282 may increase to the maximum level when voltage 284 V meets or exceeds $V_a$ and stays constant until the voltage 284 drops below $V_c$.

Once the voltage 284 rises to and above $V_a$, the "a" group of switches is engaged such that the switching network 203 exhibits a circuit to that shown in FIG. 10 for the first mode of operation. Branches 270, 271, 272, 273, 274, and 275 would each carry one sixth of the drive current $I_{drive}$ or $I_{drive}/6$, and each LED 250-255 would therefore emit only a fraction of the maximum brightness as the optical power of an LED is generally directly proportion to the current through each LED.

When the voltage 284 rises to and above $V_b$, the "b" group of switches is engaged such that the switching network 203 exhibits a circuit to that shown in FIG. 12 for the second mode of operation. Referring again to FIG. 12, the branches 276, 277, and 278 would carry one third of the drive current $I_{drive}$ or $I_{drive}/3$. Hence, each LED 250-255 would generate a greater amount of optical power than the LEDs 250-255 in the "a" circuit shown in FIG. 10, but would not realize full brightness.

When the voltage 284 rises to and above $V_c$, the "c" group of switches is engaged such that the switching network 203 exhibits a circuit to that shown in FIG. 14 for the third mode of operation. Referring again to FIG. 14, the branches 279 and 280 carries one half of the full drive current $I_{drive}$. Hence, each LED 250-255 would illuminate with the greatest optical power. This increase in drive current from $I_{drive}/6$ ("a" group) to $I_{drive}/3$ ("b" group) to $I_{drive}/2$ ("c" group) accounts for the step-wise shape of the optical power of the light emission 286.

The switching network 203 continues to operate in the third mode of operation until the voltage 284 falls below $V_c$, at which point the network 130 returns to the second mode of operation with the "b" switches operating. When the voltage 284 falls below $V_b$, at which point the network 203 returns to the first mode of operation with the "a" switches operating.

Figure 16:
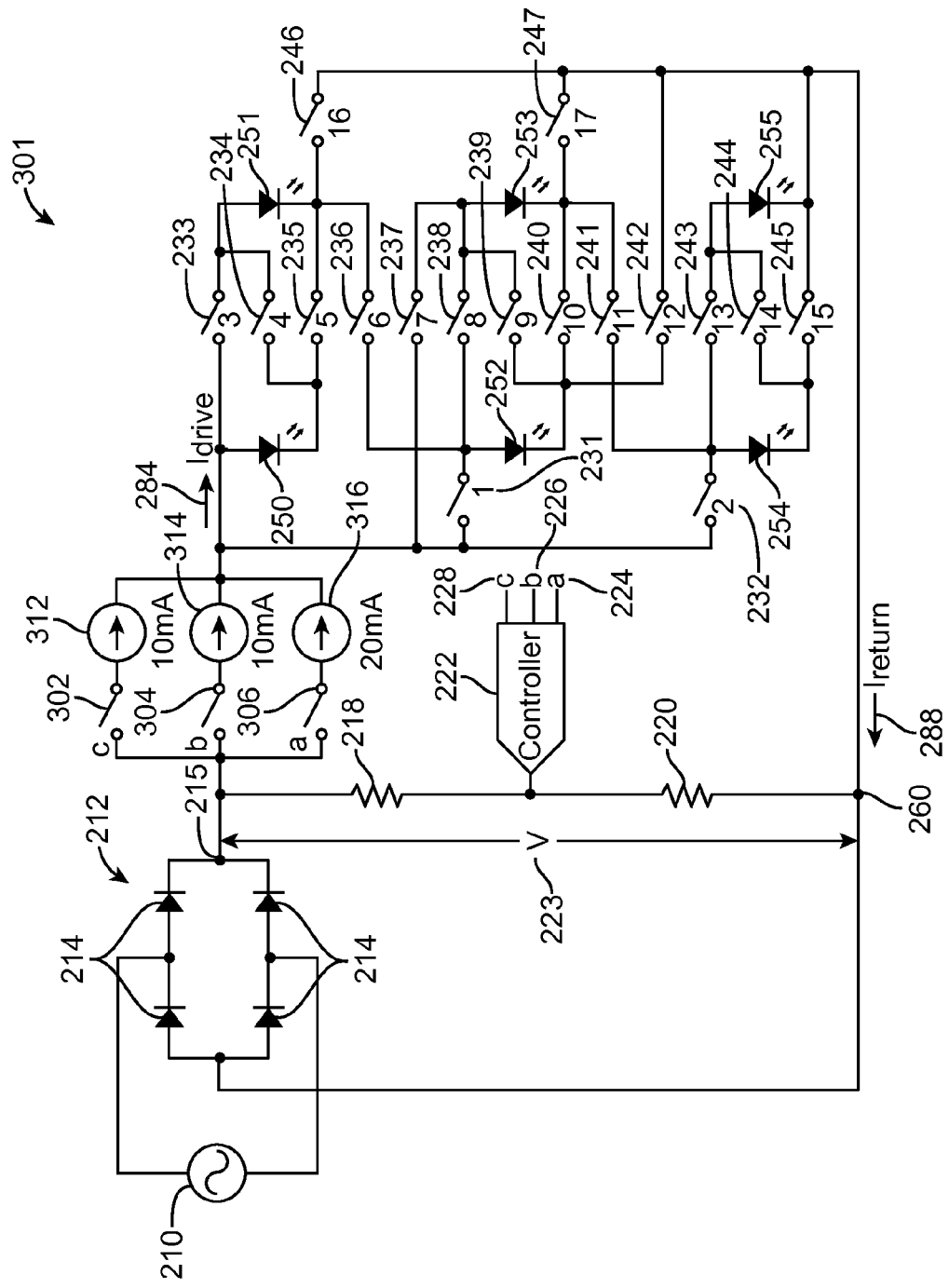
FIG. 16 depicts a CX/CXX circuit diagram of a lighting system having multiple current sources.

FIG. 16 depicts a CX circuit diagram of a lighting system 301 having multiple current sources 312, 314, and 316 and switches 302, 304, and 306. Embodiments may provide higher efficiency, power factors above 0.9, and reduced THDi in the range less than 20%. The switches 231-247 and LEDs 250-255 perform as discussed above with respect to lighting system 201. The drive current also varies in response to the instantaneous voltage V 223. When the voltage 223 meets or exceeds $V_a$ but less than $V_b$, switch 306 closes and current source 316 is enabled and provides 20 milliamperes of current. When the voltage meets or exceeds $V_b$ but less than $V_c$, switch 304 closes and current source 314 is enabled and provides 10 milliamperes of current. When the voltage meets or exceeds $V_c$, switch 302 closes and current source 312 is enabled and provides 10 milliamperes of current. Constant current sources having alternative current limits are contemplated in one or more embodiments.

Figure 17:
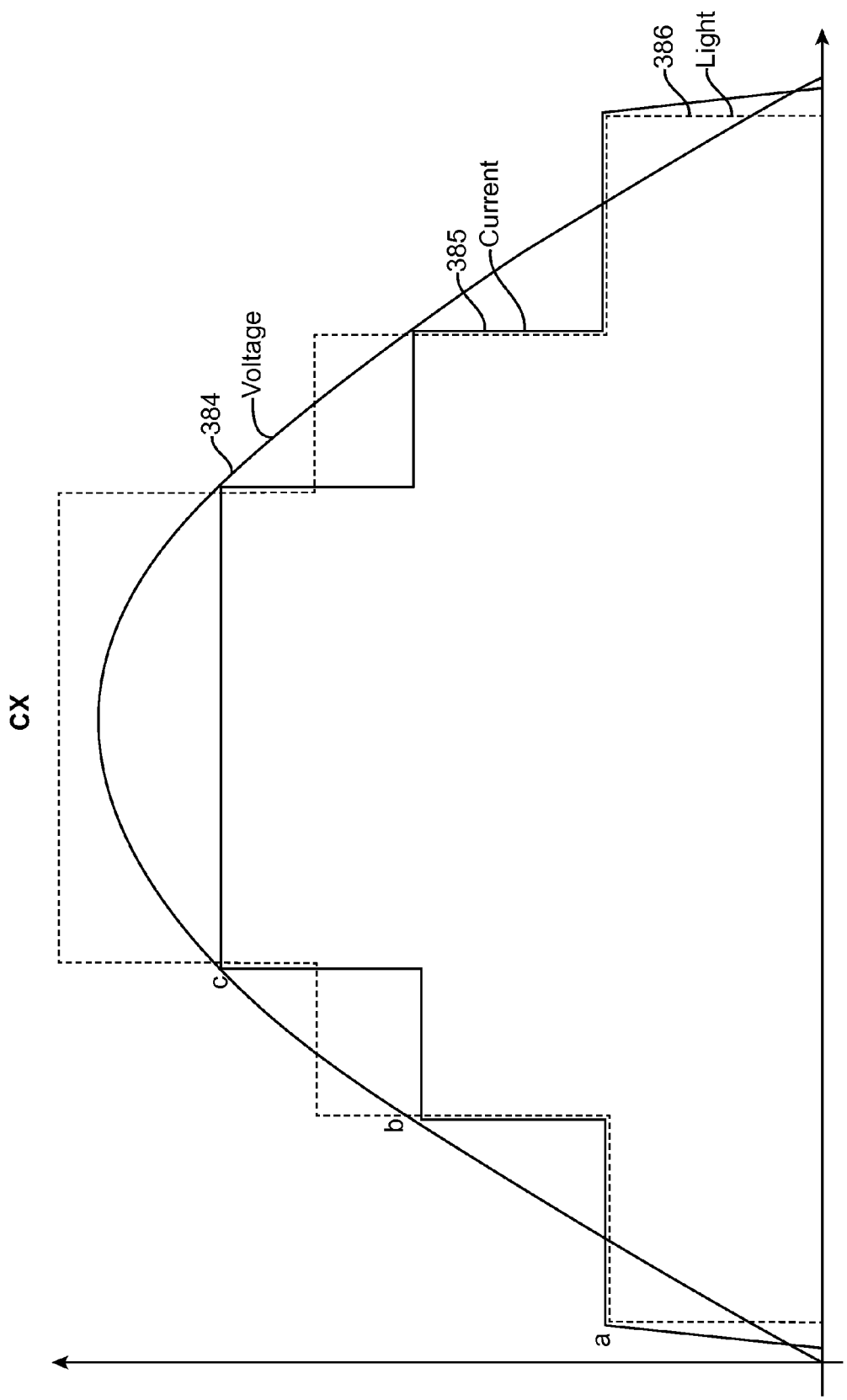
FIG. 17 is exemplary graph of the voltage, current, and optical power for an embodiment employing multiple current source in one or more embodiments.

FIG. 17 is an exemplary graph of the voltage 384, current 385, and optical power of the light emission 386 for the lighting system 301 shown in FIG. 16 employing three constant current sources 312, 314, and 316. The curve of the optical power of the light 386 is slightly offset from the current 385 for illustration purposes only. In an embodiment, constant current source 316 has a maximum current of 20 milliamperes, constant current source 314 has a maximum current of 10 milliamperes, and constant current source 312 has a maximum current of 10 milliamperes.

Once the voltage 384 rises to and above $V_a$, the "a" group of switches is engaged such that the switching network 203 exhibits a circuit to that shown in FIG. 10 for the first mode of operation. When the "a" group of switches are engaged, constant current source 316 would allow a maximum drive current of 20 milliamperes. Branches 270, 271, 272, 273, 274, and 275 would each carry one sixth of the 20 milliamperes drive current and each would be driven with 20/6=3.3 milliamperes of drive current and would therefore emit only a fraction of the maximum brightness.

When the voltage 384 rises to and above $V_b$, the "b" group of switches is engaged such that the switching network 203 exhibits a circuit to that shown in FIG. 12 for the second mode of operation. When the "b" group of switches are engaged, constant current sources 314 and 316 would allow a maximum drive current of 30 milliamperes. Branches 276, 277, and 278 would each carry one third of the drive current $I_{drive}$ or $I_{drive}/3$, which in this case is 10 milliamperes. Hence, each LED 250-255 would emit a greater amount of brightness than the LEDs 250-255 in the "a" circuit shown in FIG. 10, but would not realize full brightness.

When the voltage 384 rises to and above $V_c$, the "c" group of switches is engaged such that the switching network 203 exhibits a circuit to that shown in FIG. 14 for the third mode of operation. When the "c" group of switches are engaged, constant current sources 316, 314, and 312 would allow a maximum drive current of 40 milliamperes. Branches 279 and 280 each carries one half of the full drive current $I_{drive}$, which in this case would be 20 milliamperes. Hence, each LED 250-255 would illuminate with the greatest optical power.

The switching network continues to operate in the third mode of operation until the voltage 384 falls below $V_c$, at which point the network returns to the second mode of operation with the "b" switches operating. When the voltage 180 falls below $V_b$, the network returns to the first mode of operation with the "a" switches operating. This configuration may exhibit reduced THDi.

Figure 18:
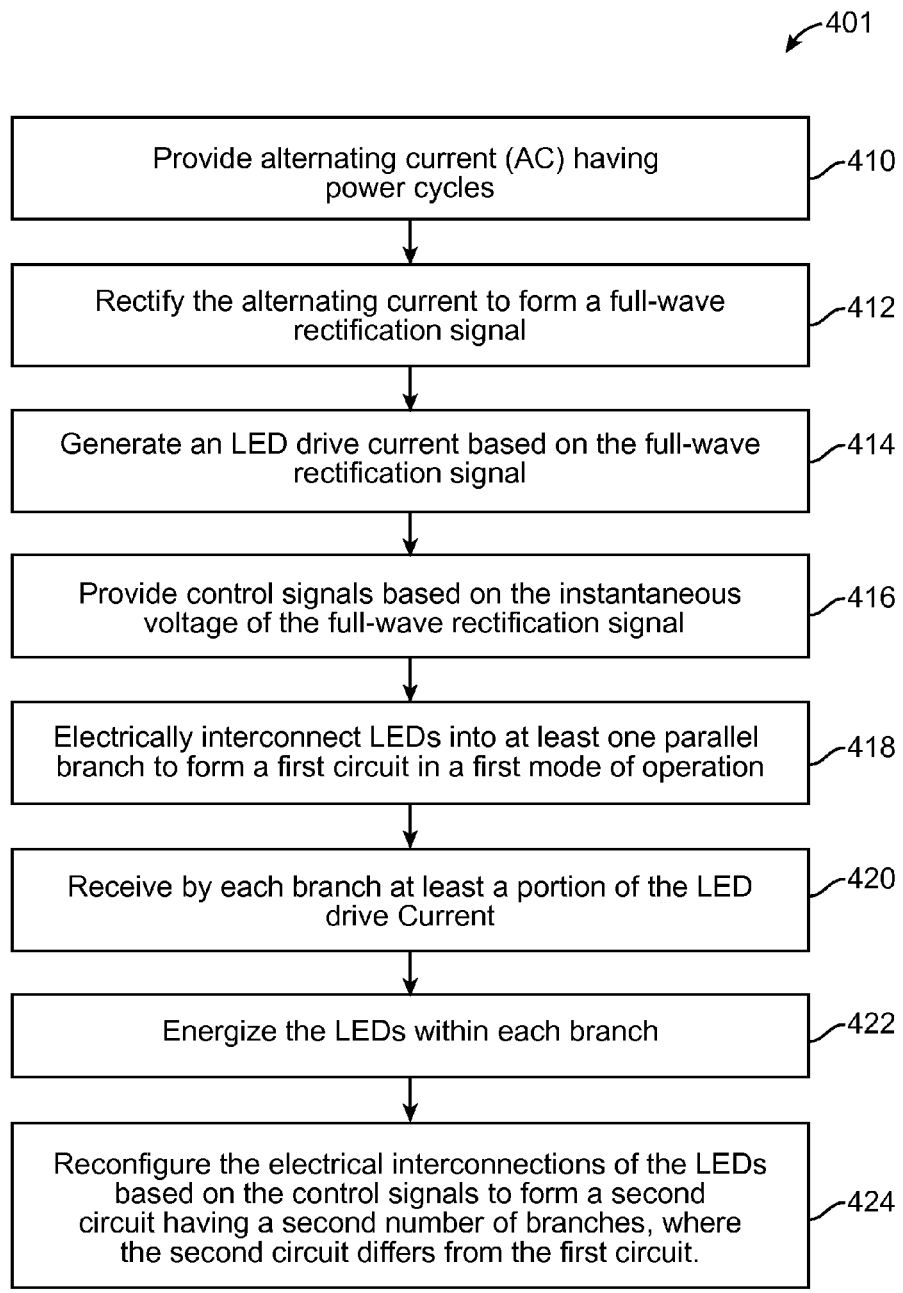
FIG. 18 is exemplary flowchart illustrating the method for providing light using a reconfigurable switching network.

FIG. 18 illustrates an exemplary flowchart 401 for a method for generating light. An alternating current (AC) having power cycles is provided (step 410). The alternating current is rectified to form a full-wave rectification signal (step 412). An LED drive current is generated based on the full-wave rectification signal (step 414). Control signals based on the instantaneous voltage of the full-wave rectification signal are provided (step 416). LEDs are electrically interconnected into at least one parallel branch to form a first circuit in a first mode of operation (step 418). Each branch receives at least a portion of the LED drive current (step 420). The LEDs within each branch are energized (step 422). The electrical interconnections of the LEDs are reconfigured based on the control signals to form a second circuit having a second number of branches, where the second circuit differs from the first circuit (step 424).

Although the invention has been discussed with reference to specific embodiments, it is apparent and should be understood that the concept can be otherwise embodied to achieve the advantages discussed. The preferred embodiments above have been described primarily as LED drivers and lighting systems having dynamically reconfigurable switching networks. In this regard, the foregoing description of the LED drivers and systems are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. An LED driving circuit for driving light emitting diodes, the circuit comprising:
   a bridge rectifier coupled to an alternating current (AC) power source;
   a pulsed DC live feed current generated by the bridge rectifier;
   a neutral return current returning current to be received by the bridge rectifier;
   a controller coupled to the AC power source, the controller monitoring the power cycle and providing control signals during time periods based on the power cycle;
   a constant current source coupled to the bridge rectifier receiving the feed current and providing an LED drive current, the constant current source limiting the LED drive current to a maximum drive current; and,
   a dynamically reconfigurable switching network receiving the LED drive current and the control signals, the switching network configured for electrically coupling LEDs forming at least one parallel branch, wherein each branch is configured to receive at least a portion of the LED drive current, energize the LEDs within the branch, and return at least a portion of the return current to the bridge rectifier, the switching network having a first mode of operation in which the LEDs are interconnected having a first number of branches, and a second mode of operation in which the LEDs are interconnected having a second number of branches not equal to the first number of branches, wherein, after a switching operation, each parallel branch comprises the same number of LEDs, wherein at least one of the LEDs is directly connected, unswitched, to the constant current source, and the directly connected LED configurable, via the switching network, to be directly connected in series with any number of other LEDs, a cathode of the directly connected LED connectable, via a single switch, to a cathode of one other LED of the LEDs without connection to the neutral return current.

2. The LED driving circuit for driving light emitting diodes of claim 1, wherein:

the controller provides the control signals based on the voltage of the pulsed DC live feed current; and, the switching network changes modes of operation in response to the control signals from the controller.

3. The LED driving circuit for driving light emitting diodes of claim 1, wherein the switching network further comprises additional modes of operation in which the LEDs are interconnected having another number of branches not equal to the number of branches in the other modes.

4. The LED driving circuit for driving light emitting diodes of claim 1, wherein the LEDs each have a string of individual LEDs connected in series.

5. The LED driving circuit for driving light emitting diodes of claim 1, wherein:

the switching network comprises a plurality of single-pole, single-throw switches and a plurality of pathways coupling the LEDs and the switches in the switching network; and, each switch comprises a Metal Oxide Semiconductor Field Effect Transistor (MOSFET).

6. The LED driving circuit for driving light emitting diodes of claim 1, wherein the constant current source limits the LED drive current based on control signals from the controller.

7. The LED driving circuit for driving light emitting diodes of claim 6, wherein the constant current source varies the limits the LED drive current based on the value of voltage of the AC power source.

8. The LED driving circuit for driving light emitting diodes of claim 1, wherein the AC power source comprises a 120 Volt source.

9. The LED driving circuit for driving light emitting diodes of claim 1, wherein the AC power source comprises a 240 Volt source.

10. The LED driving circuit for driving light emitting diodes of claim 1, wherein the AC power source comprises an 85-277 Volt source.

11. An LED lighting system comprising:

a bridge rectifier coupled to an alternating current (AC) power source;

a pulsed DC live feed current generated by the bridge rectifier;

a neutral return current returning current to be received by the bridge rectifier;

a controller coupled to the AC power source, the controller monitoring the power cycle and providing control signals during time periods based on the power cycle;

a constant current source coupled to the bridge rectifier receiving the feed current and providing an LED drive current, the constant current source limiting the LED drive current to a maximum drive current;

a plurality of LEDs; and, a dynamically reconfigurable switching network receiving the LED drive current and the control signals, the switching network electrically coupled to the LEDs forming at least one parallel branch, wherein each branch receives at least a portion of the LED drive current, energizes the LEDs within the branch, and return at least a portion of the return current to the bridge rectifier, the switching network having a first mode of operation in which the LEDs are interconnected having a first number of branches, and a second mode of operation in which the LEDs are interconnected having a second number of branches not equal to the first number of branches, wherein each parallel branch, after a switching operation, comprises the same number of LEDs, wherein at least one of the plurality of LEDs is directly connected, unswitched, to the constant current source, and the directly connected LED configurable, via the switching network, to be directly connected in series with any number of other LEDs, a cathode of the directly connected LED connectable, via a single switch, to a cathode of one other LED of the plurality of LEDs without connection to the neutral return current.

12. The LED lighting system of claim 11, wherein:

the controller provides control signals based on the voltage of the pulsed DC live feed current; and, the switching network changes modes of operation in response to the control signals from the controller.

13. The LED lighting system of claim 11, wherein the switching network further comprises additional modes of operation in which the LEDs are interconnected having another number of branches not equal to the number of branches in the other modes.

14. The LED lighting system of claim 11, wherein the LEDs each have a string of individual LEDs connected in series.

15. The LED lighting system of claim 11, wherein:

the switching network comprises a plurality of single-pole, single-throw switches and a plurality of pathways coupling the LEDs and the switches in the switching network; and, each switch comprises a Metal Oxide Semiconductor Field Effect Transistor (MOSFET).

16. The LED lighting system of claim 11, wherein the constant current source limits the LED drive current based on control signals from the controller.

17. The LED lighting system of claim 16, wherein the constant current source varies the limits the LED drive current based on the value of voltage of the AC power source.

18. The LED lighting system of claim 11, wherein the AC power source comprises a 120 Volt source.

19. The LED lighting system of claim 11, wherein the AC power source comprises a 240 volt source.

20. The LED driving circuit for driving light emitting diodes of claim 11, wherein the AC power source comprises an 85-277 Volt source.

21. A method for generating light comprising:

providing alternating current (AC) having power cycles;

rectifying the alternating current to form a full-wave rectification signal;

generating a LED drive current based on the full-wave rectification signal;

electrically interconnecting LEDs into at least one parallel branch to form a first circuit in a first mode of operation;

receiving by each branch at least a portion of the LED drive current;

returning any unused portions of the LED drive current as neutral return current to a rectifier performing the rectifying step;

energizing the LEDs within each branch;

reconfiguring the electrical interconnections of the LEDs to form a second circuit having a second number of branches, where the second circuit differs from the first circuit, and where each parallel branch, after a switching operation, has the same number of LEDs, wherein at least one of the LEDs is directly connected, unswitched, to the LED drive current, and the directly connected LED configurable, via a switching network, to be directly connected in series with any number of other LEDs, a cathode of the directly connected LED connectable, via a single switch, to a cathode of one other LED of the LEDs without connection to the neutral return current.

22. The method for generating light of claim 21, further comprising providing control signals based on the instantaneous voltage of the full-wave rectification signal, wherein reconfiguring the electrical coupling of the LEDs comprises changing the modes of operation based on the control signals.

* * * * *